United States Patent
Watanabe

(10) Patent No.: US 8,873,904 B2
(45) Date of Patent: Oct. 28, 2014

(54) WAVELENGTH SELECTIVE SWITCH

(75) Inventor: Satoshi Watanabe, Tokyo (JP)

(73) Assignee: JDS Uniphase Corporation, Milpitas, CA (US)

( * ) Notice: Subject to any disclaimer, the term of this patent is extended or adjusted under 35 U.S.C. 154(b) by 557 days.

(21) Appl. No.: 13/043,919

(22) Filed: Mar. 9, 2011

(65) Prior Publication Data
US 2011/0222136 A1 Sep. 15, 2011

(30) Foreign Application Priority Data
Mar. 10, 2010 (JP) .................. 2010-053635

(51) Int. Cl.
| | |
|---|---|
| G02B 6/26 | (2006.01) |
| H04J 14/00 | (2006.01) |
| G02B 5/08 | (2006.01) |
| G02B 6/293 | (2006.01) |
| G02B 6/35 | (2006.01) |
| G02B 26/08 | (2006.01) |
| G02B 5/20 | (2006.01) |

(52) U.S. Cl.
CPC .......... *G02B 26/0833* (2013.01); *G02B 5/0808* (2013.01); *G02B 6/29395* (2013.01); *G02B 6/3548* (2013.01); *G02B 5/205* (2013.01)
USPC .................. 385/18; 385/17; 398/48

(58) Field of Classification Search
CPC .. G02B 6/3512; G02B 6/3546; G02B 6/3556; G02B 6/29395

USPC .............. 385/10, 18, 24, 31, 37, 39; 359/566; 398/87, 48
See application file for complete search history.

(56) References Cited

U.S. PATENT DOCUMENTS 6,825,981 B2 11/2004 Takushima et al.
7,428,997 B2 * 9/2008 Wiklof et al. ............ 235/462.42

FOREIGN PATENT DOCUMENTS

JP 2004-133203 4/2004

OTHER PUBLICATIONS

Finisar, Programmable narrow-band filtering using the WaveShaper1000E and WaveShaper 4000E, Mar. 2009.*

* cited by examiner

*Primary Examiner* — Charlie Peng
*Assistant Examiner* — Erin Chiem
(74) *Attorney, Agent, or Firm* — JDS Uniphase Corporation

(57) ABSTRACT

A wavelength selective switch according to the present invention includes at least one input port for inputting wavelength-multiplexed light, a dispersive element which receives the light from the input port, and disperses the received light, a light converging element which converges dispersed light which has been dispersed for each wavelength, a light deflecting member having a plurality of reflecting optical elements which are capable of independently deflecting each dispersed light from the light converging element, and at least one output port which receives light which has been deflected by the light deflecting member. An area having a reflectivity higher than a central area of the reflecting surface is formed in at least a part of an end portion of the reflecting surface in the dispersive direction by the dispersive element.

15 Claims, 17 Drawing Sheets

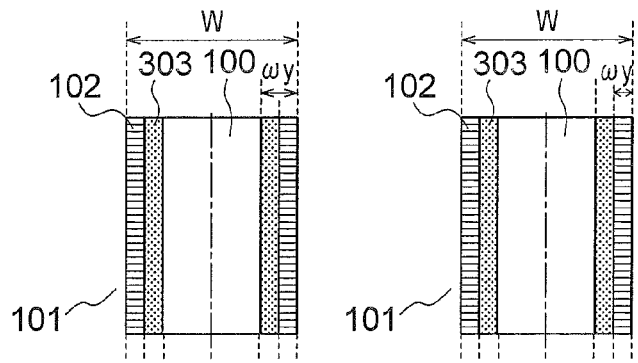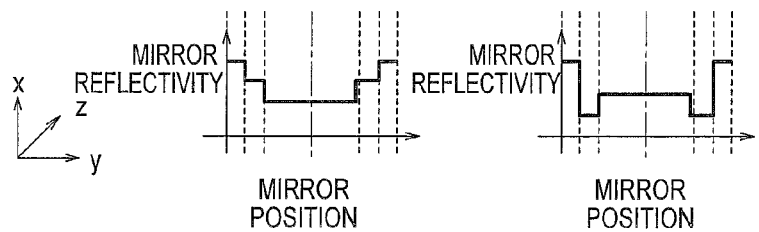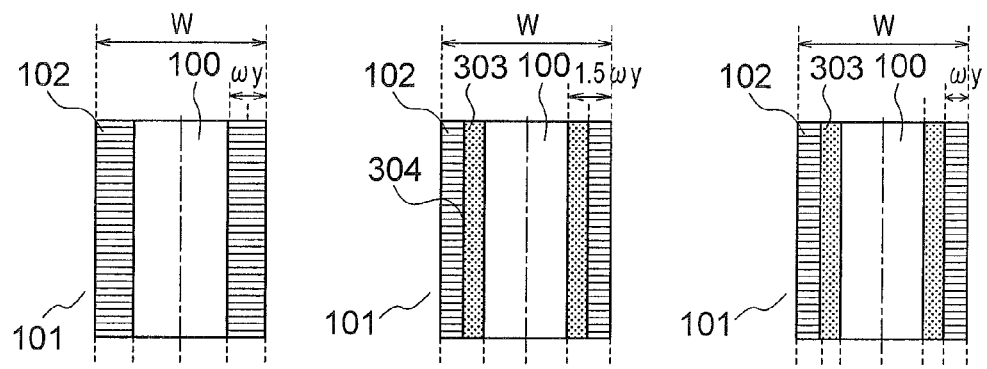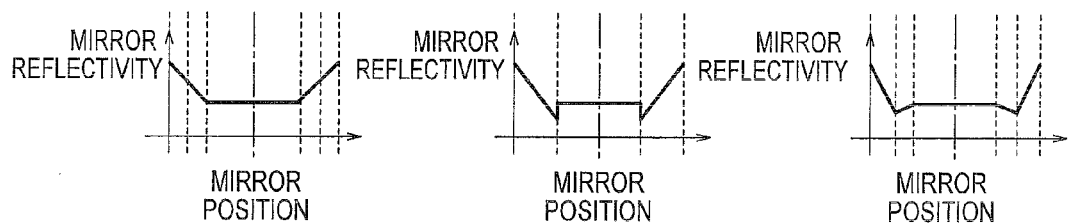

POSITION COORDINATES IN MOVABLE REFLECTOR
(DIRECTION OF WAVELENGTH DISPERSION)

REFLECTIVITY OF CROSS SECTION A

WEIGHTED AVERAGE REFLECTIVITY

MIRROR POSITION

WAVELENGTH SELECTIVE SWITCH

CROSS-REFERENCE TO RELATED APPLICATION

The present application is based upon and claims the benefit of priority from the prior Japanese Patent Application No. 2010-53635 filed on Mar. 10, 2010; the entire contents of which are incorporated herein by reference.

BACKGROUND OF THE INVENTION

1. Field of the Invention

The present invention relates to a technology of a wavelength selective switch.

2. Description of the Related Art

For realizing a wide passband, the signal light needed to be sharply converged on deflective elements by a light converging element. Generally, for making the light sharply-converged, a beam diameter of light when the light is incident on the light converging element is to be made large. However, to make the beam diameter large means to make an apparatus large in size.

In Japanese Patent Application Laid-open Publication No. 2004-133203, a structure which reduce the size of an apparatus in a direction perpendicular to a dispersive direction by making an arrangement such that a beam diameter of light incident on a dispersive element to be large in a dispersive direction, as compared to a beam diameter of light in a direction perpendicular to the dispersive direction, has been described.

However, in the structure according to Japanese Patent Application Laid-open Publication No. 2004-133203, the beam diameter in the dispersive direction when the light is incident on the dispersive element is large as it has been, and in this structure it is not possible to reduce the size of each optical element in the dispersive direction and the overall wavelength selective switch.

SUMMARY OF THE INVENTION

The present invention has been made in view of the abovementioned circumstances, and an object of the present invention is to provide a wavelength selective switch which is capable of widening a passband without allowing a beam diameter to change, while maintaining a simple, low-price, light-weight, and compact structure.

To solve the abovementioned issues, the wavelength selective switch according to the present invention includes at least one input port for inputting wavelength-multiplexed light, a dispersive element which receives the light from the input port, and disperses the received light, a light converging element which converges dispersed light which has been dispersed for each wavelength, a light deflecting member having a plurality of reflecting optical elements which are capable of independently deflecting each dispersed light from the light converging element, and at least one output port which receives light which has been deflected by the light deflecting member, and at least one of the reflecting optical elements includes a reflecting surface having a reflectivity distribution, and an area having a reflectivity higher than a central area of the reflecting surface is formed on the reflecting surface having the reflectivity distribution, in at least a part of an end portion of the reflecting surface in the dispersive direction by the dispersive element.

In the present invention, it is possible to let the area having the reflectivity higher than the central area to be an area with a width smaller than a beam diameter on the reflecting surface of the light dispersed along the dispersive direction, and the area starts from the end portion of the reflecting surface in the dispersive direction.

In the present invention, it is possible to let the reflectivity distribution to be formed to be the same reflectivity distribution in a direction perpendicular to the dispersive direction.

In the present invention, it is possible to let the reflectivity distribution to be formed such that the reflectivity gradually increases from the central area, toward the end portion of the reflecting surface in the dispersive direction.

In the present invention, it is possible to let an area in which the reflectivity is lower with respect to the central area to be formed between the central area and the area having a reflectivity higher than the central area.

BRIEF DESCRIPTION OF THE DRAWINGS

FIG. 3A, FIG. 3B, FIG. 3C, FIG. 3D, FIG. 3E, FIG. 3F, FIG. 3G, FIG. 3H, FIG. 3I, and FIG. 3J (herein after, 'FIG. 3A to FIG. 3J') are diagrams for describing modified embodiments of the first embodiment;

DETAILED DESCRIPTION OF THE INVENTION

Figure 1A:
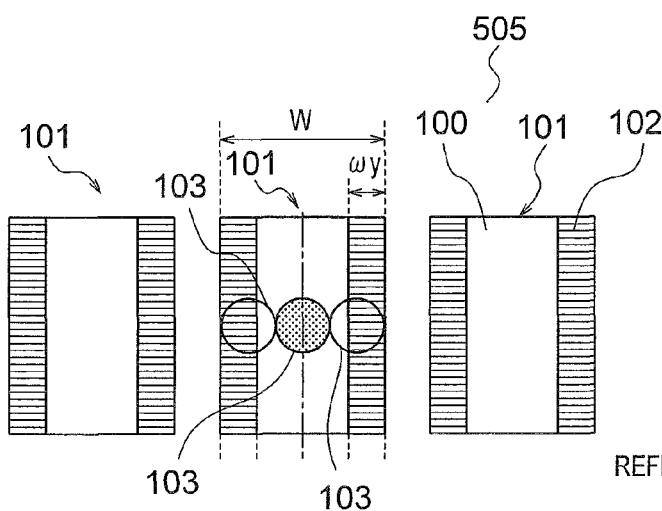
FIG. 1A, FIG. 1B, FIG. 1C, FIG. 1D, and FIG. 1E (hereinafter, 'FIG. 1A to FIG. 1E') are diagrams for describing an example of a structure of a micro mirror (reflecting optical element) of a wavelength selective switch according to a first embodiment.

Exemplary embodiments and modified embodiments thereof of a wavelength selective switch according to the present invention will be described below in detail by referring to the accompanying diagrams. However, the present invention is not restricted to the embodiments and the modified embodiments described below.

First Embodiment

A first embodiment of the wavelength selective switch according to the present invention will be described below while referring to the accompanying diagrams. In all the diagrams, same reference numerals indicate same or equivalent components.

Figure 5:
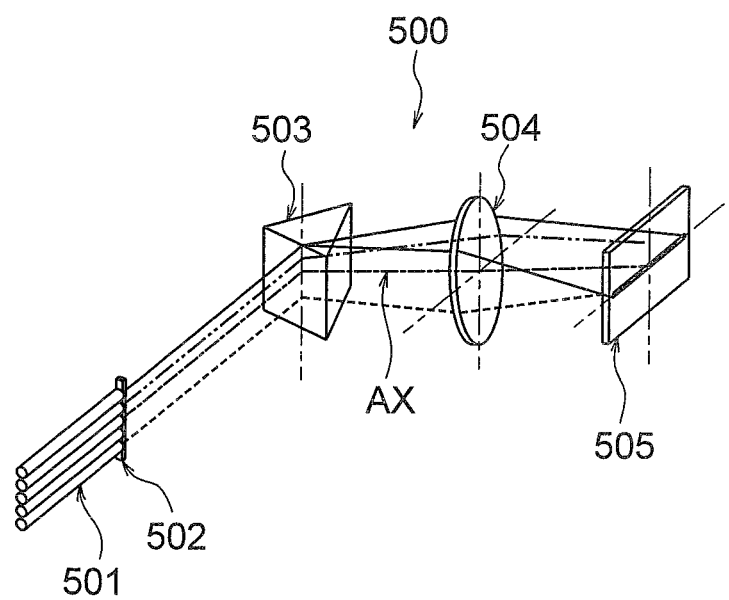
FIG. 5 is a perspective view in which, an overall structure of the wavelength selective switch according to the first embodiment, is shown schematically.

In FIG. 5, an overall structure of a wavelength selective switch according to the first embodiment is shown.

The first embodiment is a wavelength selective switch 500 of a so-called transmission type. The wavelength selective switch 500 includes a fiber array 501 made of a plurality of optical fibers, a micro lens array 502, a dispersive element 503, a lens 504, and an MEMS mirror array 505 which is an MEMS (Micro Electro Mechanical Systems) module.

Each optical fiber in the fiber array 501 and each micro lens in the micro lens array 502 are in a pair. These pairs are disposed in an array form.

The fiber array 501 functions both as an input port and as an output port of light. Wavelength-multiplexed light is launched from one of the optical fibers (hereinafter, 'a first optical fiber') which is the input port. The light which has been launched from the optical fiber is converted to a parallel light beam in the micro lens array 502.

The light which has been launched from the micro lens array 502 is incident on the dispersive element 503. The dispersive element 503 disperses the wavelength-multiplexed light in a band form.

The lens 504 is a light converging element. The lens 504 converges the dispersed light dispersed by the dispersive element 503, and guides the dispersed light to a predetermined position of the MEMS mirror array 505 which is a light deflecting member according to a wavelength of the dispersed light.

Figure 10:
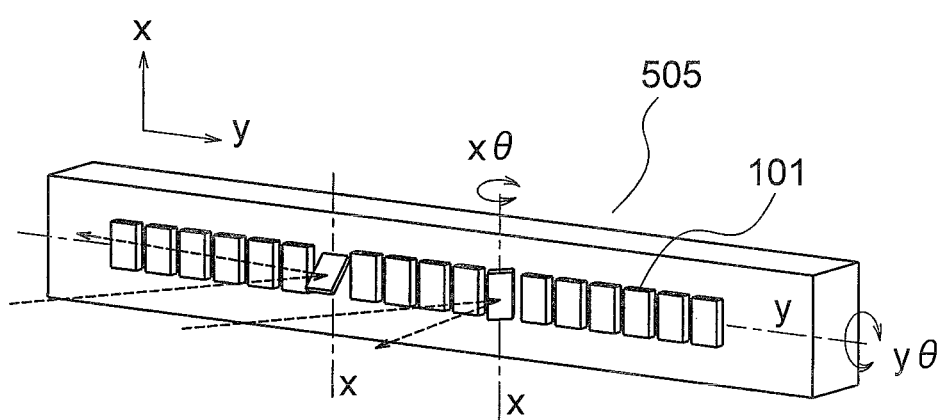
FIG. 10 is a perspective view showing an example of a structure of an array of a micro mirror (MEMS mirror array) as a plurality of reflecting optical elements according to the present invention.

The MEMS mirror array 505 which is an MEMS module, as shown in FIG. 10, includes an array of micro mirrors 101 (MEMS mirror array) as a plurality of reflecting optical elements which has reflecting surface for independently deflecting each dispersed light.

Each of the micro mirrors 101 is rotatable around a local x-axis and y-axis, and by rotating mainly around y-axis, the micro mirror 101 reflects dispersed light which has been incident thereon, in a direction different from a direction of incidence. Where the y-axis is let to be an axis which corresponds to a dispersive direction by the dispersive element 503.

Light reflected in the same direction (AX) which differ from the direction of incidence, by the plurality of micro mirrors 101 of the MEMS mirror array 505, is integrated on the dispersive element 503 by the lens 504, and combines the same wavelength-multiplexed light.

Whereas, light reflected in a direction different from the direction of incidence and the AX-direction by a different micro mirror 101 is relayed on the dispersive element 503 by the lens 504, and is diffracted, but do not integrate with the light reflected in the AX-direction.

These lights are incident on different fibers, other than the input port of the fiber array 501. The fiber on which the light is incident works as an output port.

In this manner, wavelength-multiplexed light launched from the first optical fiber can be incident selectively on another fiber depended on an angle of the reflecting surface of the micro mirrors 101 of the MEMS mirror array 505 for each wavelength independently.

Next, a structure of the micro mirror 101 according to the first embodiment will be described below by using FIG. 1A, FIG. 1B, FIG. 1C, FIG. 1D, and FIG. 1E.

FIG. 1A shows an array of three extracted micro mirrors 101 aligned in the y-axis direction diagrammatically.

In the first embodiment, an arrangement is made such that each micro mirror 101 has an area 102 having a reflectivity higher than a central area 100 in an end portion of the reflecting surface of the micro mirror in the dispersive direction. A reflectivity distribution at a boundary of the central area 100 and the area 102 is discontinuous. Moreover, the reflectivity in each area is uniform respectively (refer to FIG. 1E). Here, the reflectivity distribution means a position dependence of the reflectivity in the overall area on a reflecting surface of the micro mirror. In a case of focusing on the position dependence of the reflectivity in a restricted area such as the area 102, it is to be termed as an in-area reflectivity distribution.

Figure 11A:
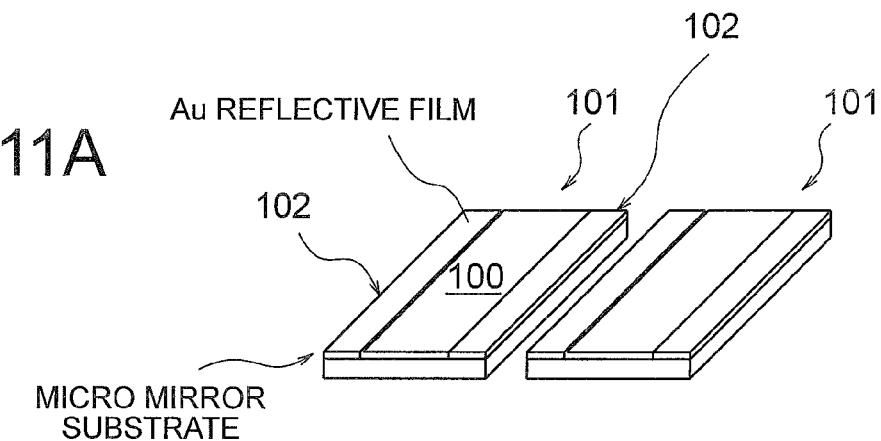
FIG. 11A, FIG. 11B, FIG. 11C (hereinafter, 'FIG. 11A to FIG. 11C') are diagrams in which, application examples of a metallic reflective film on the micro mirror (reflecting optical element) according to the present invention, and a relationship between a reflectivity and a film thickness for the reflecting surface of the micro mirror are shown.

Moreover, a difference in the reflectivity in each of the areas 101 and 102 is realizable by controlling thickness of a metallic reflective film which is formed on a reflecting surface of the micro mirror 101 (refer to FIG. 11A).

For example, the metallic reflective film of the micro mirror 101 can be made of AU. When a film thickness of Au is thin such as 80 nm or less, there is a positive correlation between the film thickness and the reflectivity.

Figure 11B:
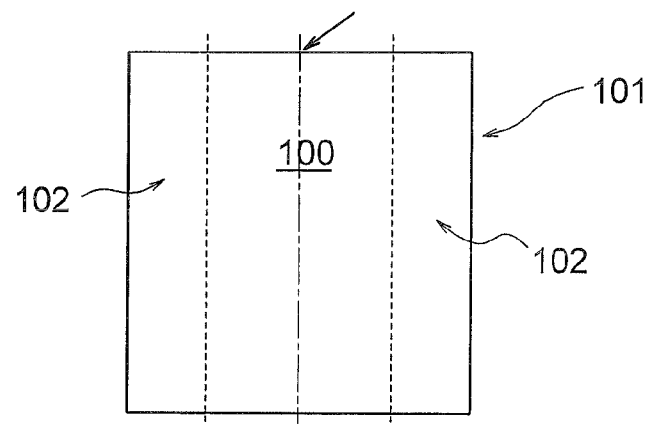
Figure 11C:
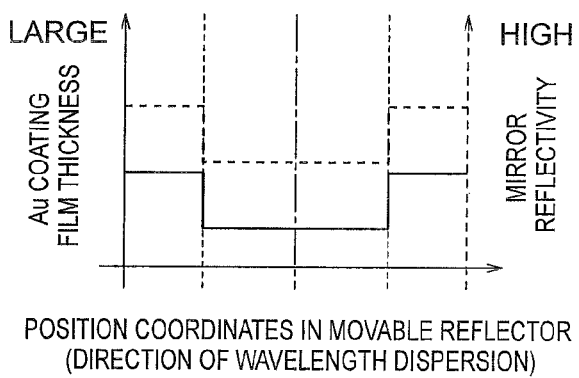

Therefore, when a thickness distribution of Au is adjusted within a thin range of 80 nm or less as in FIG. 11A, FIG. 11B, and FIG. 11C, it is possible to achieve the reflecting surface of the micro mirror 101 in which the reflectivity is distributed spatially.

In an example in FIG. 11A, a metallic reflective film of Au which is thinner at a central portion (the area 100) than an end portion (the area 102) is formed on a micro mirror substrate. In this case, as shown in FIG. 11C, when the thickness of the metallic film of Au changes in range of 80 nm or less, there is an effect on the reflectivity of the reflecting surface of the micro mirror 101.

In other words, a reflection loss (a loss of reflection) near the central portion (the area 100) is large. Consequently, the reflectivity of the end portion (the area 102) of the reflecting surface of the micro mirror 101 can be higher than the reflectivity at the central portion (the area 100).

The micro mirror array 505 according to the first embodiment being manufactured by an MEMS technology, controlling the reflectivity with the film thickness of metal in thin range is effective for reducing a deformation or warping (curling) of the micro mirror 101.

Here, an arrangement is such that the reflectivity distribution within the reflecting surface of the micro mirror according to the first embodiment is satisfied the following conditional expression (1) and (2)

$$\overline{R}_1 < \overline{R}_2 \quad \text{(expression 1)}$$

where, $\overline{R}_1$ denotes an average reflectivity of an area $$\left(0 < y_1 \leq \frac{W}{2} - 2\omega_y\right)$$

(this is let to be (expression 8) near the center of the reflecting surface of the micro mirror, $\overline{R}_2$ denotes an average reflectivity of an area $$\left(\frac{W}{2} - 2\omega_y < y_2 \leq \frac{W}{2}\right)$$

Figure 6A:
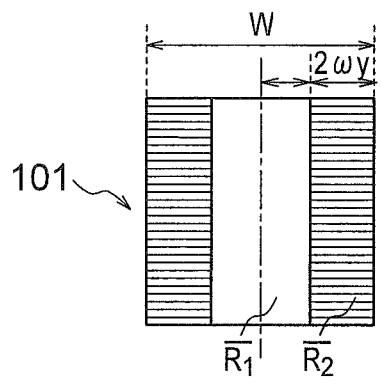
FIG. 6A, FIG. 6B, FIG. 6C, and FIG. 6D (hereinafter, 'FIG. 6A to FIG. 6D') are diagrams for describing an expression about a suitable reflectivity condition and a reflectivity distribution on the reflecting surface of the micro mirror according to the present invention.

(this is let to be (expression 9) near the end portion of the reflecting surface of the micro mirror (FIG. 6A)

$$0.89 < I(0, y)/I(0, 0) < 1.13 \quad \text{(expression 2)}$$

$$\left(-\frac{W}{2} + 0.617\omega_y < y < \frac{W}{2} - 0.617\omega_y\right)$$

Here,

I(x', y') denotes intensity of light returning from the reflecting surface of the micro mirror of light incident at (x', y') on the reflecting surface of the micro mirror, $$I(x', y') = \int_{-\frac{D}{2}}^{\frac{D}{2}} \int_{-\frac{W}{2}}^{\frac{W}{2}} R(x, y) G_{x',y'}(x, y) dx dy$$

(this is let to be (expression 10))

$G_{x',y'}(x, y)$ denotes a Gaussian beam intensity of dispersed light having a peak at (x', y') on the reflecting surface of the micro mirror, $$G_{x',y'}(x, y) = A \exp\left\{-\frac{(x-x')^2}{2\sigma_{x'}^2} - \frac{(y-y')^2}{2\sigma_{y'}^2}\right\}$$

(this is let to be (expression 11))

R(x, y) denotes a local reflectivity at (x, y) on the reflecting surface of the micro mirror, $\omega_x$ and $\omega_y$ are radii of beam spots of the dispersed light on the reflecting surface of the micro mirror, and the radius of beams spot means a radius up to a position at which, the intensity of the dispersed light becomes $1/e^2$ with respect to the intensity at the center ($\omega x=2\sigma x'$, $\omega y=2\sigma y'$).

−D/2<x<D/2 (this is let to be (expression 12)) is a micro mirror area in x-direction −W/2<y<W/2 (this is let to be (expression 13)) is a micro mirror area in y-direction (here, micro mirror width is given by W).

According to the micro mirror structure of the first embodiment, it is possible to have an action and an effect as described below.

First of all, a passband of a conventional wavelength selective switch with a conventional micro mirror will be described by using FIG. 17.

Figure 17A:
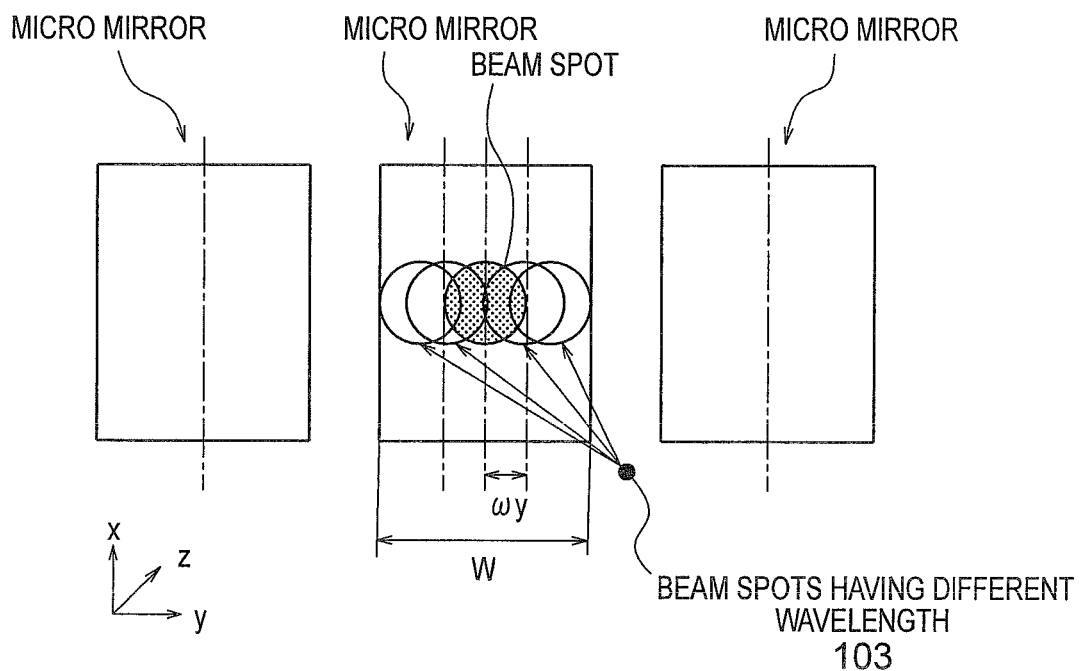
FIG. 17A and FIG. 17B are diagrams for describing a relationship between a passband and a micro mirror of a conventional wavelength selective switch.
Figure 17B:
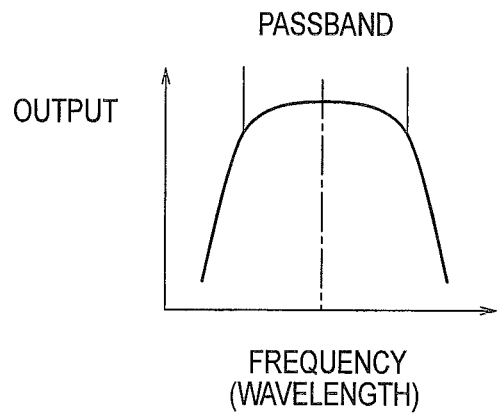

FIG. 17A and FIG. 17B show an array of three extracted micro mirrors aligned in y-axis direction. A beam spot 103 is dispersed by a dispersive element, and is guided to a micro mirror by a lens (refer to FIG. 5 for example).

A position of incidence of the beam spot 103 on the reflecting surface of the micro mirror changes according to each wavelength. Generally, designing and adjustment is carried out such that a beam of a wavelength coinciding with a wavelength of an ITU grid (ITU (a grid standard stipulated by International Telecommunication Union) is converged at a center of the reflecting surface of the micro mirror. In other words, with the wavelength of the beam spot 103 going away from the ITU grid, the beam spot 103 is converged at a position away from the center of the reflecting surface of the micro mirror.

In a case of a wavelength selective switch in which the micro mirror is used, a reduction in transmittance occurs due to sticking out from the reflecting surface of the micro mirror of a part of the beam spot incident on an end portion of the reflecting surface of the micro mirror when the light of each wavelength which is dispersed is incident on the reflecting surface of the micro mirror. When the passband is let to be a frequency area for which the transmittance with respect to the ITU grid becomes ±0.5 dB, for the passband of the conventional wavelength selective switch, sticking out of the beam equivalent to 0.5 dB at two ends of the reflecting surface of the micro mirror is an acceptable limit, and the passband is proportional to $(W-1.23\omega_y)$. In this case, the passband could be determined uniquely when a width of the reflecting surface of the micro mirror, a diameter of the beam spot in the dispersive direction, and a distance between centers of adjacent micro mirrors are determined.

Next, a relationship between the passband and the micro mirror when the micro mirror in the first embodiment is used will be described below by using diagrams from FIG. 1A to FIG. 1E.

FIG. 1A shows diagrammatically an array of three extracted micro mirrors 101 aligned in the y-axis direction.

A relationship of the wavelength of the beam spot 103 and the position of incidence on the reflecting surface of the micro mirror 101 is as described in the micro mirror of a conventional structure.

As the beam spot 103 moves away from the center of the reflecting surface of the micro mirror 101, a bottom of the beam spot 103 falls outside of the reflecting surface of the micro mirror 101.

In the first embodiment, the mirror 101 has the area 102 at the end portion of the reflecting surface of the micro mirror in the dispersive direction having a reflectivity higher than the reflectivity of the central area 100 in order to satisfy expression (1). Therefore, when the bottom of the beam spot 103 comes to a position of falling out of the reflecting surface of the micro mirror, at least a part of the beam spot 103 is reflected at the area 102 (refer to a center in FIG. 1A).

Therefore, intensity of light reflected of the beam spot 103 incident on an end portion of the reflecting surface of the micro mirror is counterbalanced by reduction of intensity due to falling outside of the reflecting surface of the micro mirror and increase of intensity due to reflection at the area 102. As a result, difference between intensity of light reflected at an end portion of the reflecting surface of the micro mirror and intensity of light reflected at the central area 100 could be less than the conventional wavelength selective switch.

Moreover, it is preferable that the area 102 is an area with a width smaller than a beam diameter on the reflecting surface of the light dispersed along the dispersive direction, and the area starts from the end portion of the reflecting surface in the dispersive direction. This is because, when a high-reflectivity area is wider than a beam diameter on the reflecting surface of the micro mirror, the high-reflectivity area contributes mostly to increase a ripple within the passband for the light without sticking out of the beam spot from the end portion of the reflecting surface of the micro mirror due to being reflected at the high-reflectivity portion.

Moreover, in the first embodiment, the arrangement is made such that expression (2) is satisfied.

Each of 0.89 and 1.13 in expression (2) is derived from intensity for which, the intensity of light reflected in the area on the reflecting surface of the micro mirror of the following expression (14) becomes −0.5 dB and +0.5 dB with respect to the intensity of light reflected at the center of the reflecting surface of the micro mirror respectively.

$$-W/2+0.617\omega_y < y < W/2-0.617\omega_y \quad \text{(expression 14)}$$

When the values are out of the upper and lower range of the expression (2), the passband is determined by a frequency area up to that point. So it is preferable that the reflectivity distribution of the first embodiment is formed to satisfy expression (2).

Figure 1B:
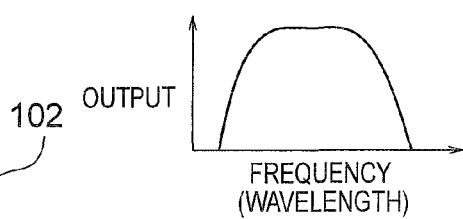
Figure 1C:
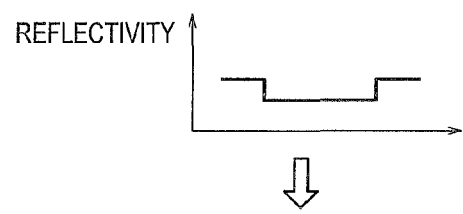
Figure 1E:
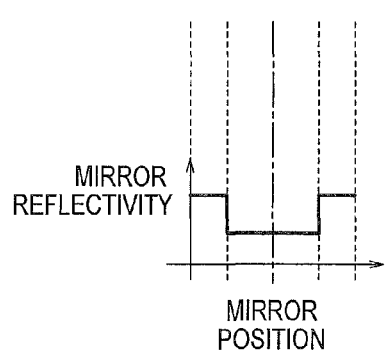
Figure 1D:
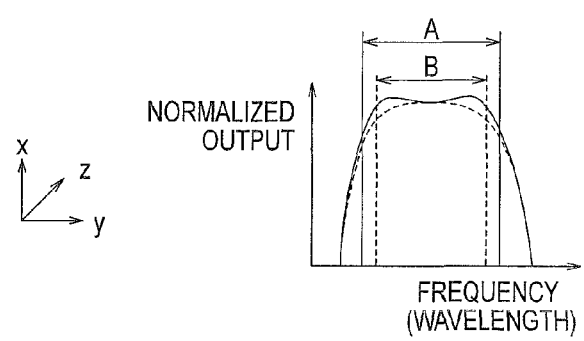

A principle of the first embodiment is shown to be simplified in FIG. 1B, FIG. 1C, and FIG. 1D.

Transmission characteristics when the reflectivity is constant are shown in FIG. 1B. The reflectivity distribution in the dispersive direction of the reflecting surface of the micro mirror 101 in the first embodiment is shown in FIG. 1C. The reflectivity distribution of the micro mirror in the first embodiment serves like a correcting filter which is capable of preventing degrading of transmission characteristics by reducing a decrease in the intensity of light reflected at the end portion of the reflecting surface of the micro mirror 101, and as shown in FIG. 1D, it is possible to realize a passband A larger (wider) than the conventional passband B.

Figure 2:
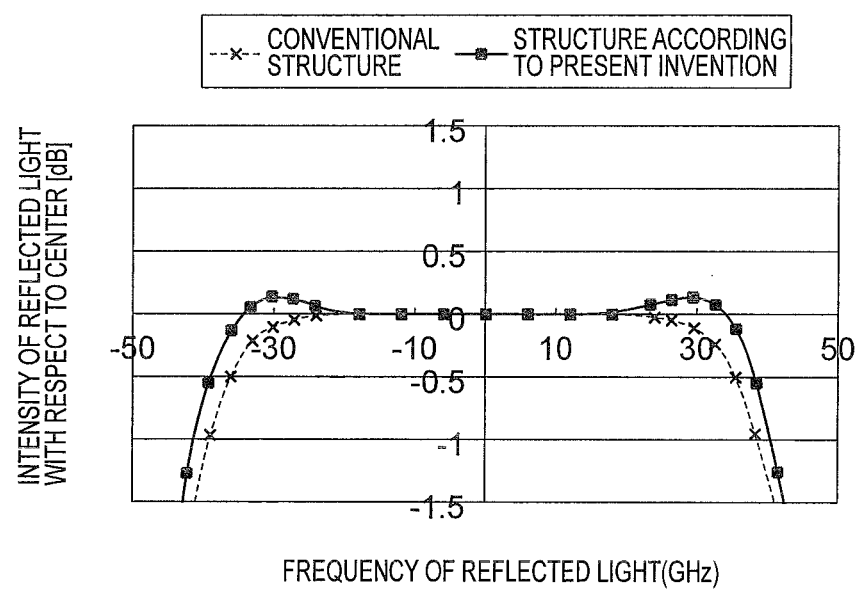
FIG. 2 is a simulation result of frequency (wavelength) dependence of intensity of light reflected at the micro mirror when the structure of the first embodiment has been used.

In FIG. 2, a simulation result of frequency (wavelength) dependence of intensity of light reflected at the reflecting surface of the micro mirror when the structure of the first embodiment is used, is shown. Parameters in the simulation are as follow.

The central area 100 including the center of the reflecting surface of the micro mirror is indicated by the following expression (15)

$$-W/2+\omega_y < y < W/2-\omega_y \quad \text{(expression 15)}$$

The area 102 which includes the end portion of the reflecting surface of the micro mirror, and which has a reflectivity higher than (the reflectivity) of the central area 100 is indicated by the following expression (16).

$$-W/2 < y < -W/2+\omega_y, -W/2-\omega_y < y < W/2 \quad \text{(expression 16)}$$

where, the width of (the reflecting surface of) the micro mirror is W, the beam spot diameter $\omega_y$ on the reflecting surface of the micro mirror in the y-axis direction is W/6, the distance between the centers of the adjacent micro mirrors is W/0.9, (light of a wavelength separated by 100 GHz in frequency is incident at the centers of the adjacent micro mirrors), and a relative reflectivity of the area 102 with respect to the reflectivity of the central area 100 is 1.12, and the structure satisfies conditional expression (1) and conditional expression (2).

From FIG. 2, it is revealed that a frequency width which generates decrease of 0.5 dB is widened by this embodiment because reduction of intensity due to falling outside of the reflecting surface of the micro mirror and increase of intensity due to reflection at the area 102 is counterbalanced. Moreover, it is revealed that at any point in the area of expression (14), it does not have a reflecting light intensity exceeding ±0.5 dB.

As it has been described above, when the structure of the first embodiment is used, by making the reflectivity of the end portion of the reflecting surface of the micro mirror (area 102) higher as compared to the reflectivity at the center of the reflecting surface of the micro mirror (central area 100), it is possible to counterbalance the reduction of intensity due to falling outside of the reflecting surface of the micro mirror and increase of intensity due to reflection at the area 102, and widening of a width of the passband is realized without changing the diameter of the beam spot. Since there is no change in the diameter of the beam spot, it is possible to realize the wide passband without causing an increase in size of an apparatus in the dispersive direction as well as in the direction perpendicular to the dispersive direction. Moreover, since there is no change in the diameter of beam incident on the dispersive element 503 and the converging lens 504, it is effective for cost reduction as it does not lead to an increase in size of individual elements such as the dispersive element 503 and the converging lens 504.

First Modified Embodiment of First Embodiment

A first modified embodiment of the first embodiment will be described below.

An overall structure of a wavelength selective switch according to the first modified embodiment is similar to the structure of the wavelength selective switch according to the first embodiment.

A micro mirror according to the first modified embodiment will be described below by using FIG. 3A.

Each micro mirror 101 in the first modified embodiment of the first embodiment is formed to have an area 303 having a reflectivity higher than the central area 100 and lower than the area 102, and the area 303 is formed between the area 100 and the area 102.

At each boundary of the central area 100, the area 303, and the area 102, the reflectivity distribution is discontinuous, and does not have an in-area reflectivity distribution within each of the areas (the reflectivity is uniform) (refer to FIG. 3F). Moreover, a difference in the reflectivity in the areas is formed by controlling a film thickness of a metallic reflective film which has been formed on the reflecting surface of the micro mirror 101.

Even in the first modified embodiment of the first embodiment, the arrangement is made to be such that the reflectivity distribution satisfies expression (1) and expression (2).

For the first modified embodiment of the first embodiment to satisfy expression (1), since it has the area 102 of the end portion of the reflecting surface of the micro mirror 101 having the reflectivity higher than the central area 100, and the area 303 having the reflectivity lower than the area 102, and higher than the central area 100, when the bottom of the beam spot (refer to reference numeral 103 in FIG. 1A), reaches to a position of falling outside the micro mirror, at least a part of the beam spot 103 is reflected at the area 102. Therefore, the intensity of light reflected of the beam spot 103 incident on the end portion of the reflecting surface of the micro mirror is counterbalanced by reduction of intensity due to falling outside of the reflecting surface of the micro mirror and increase of intensity due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

Furthermore, in the first modified embodiment of the first embodiment, the arrangement is such that the reflectivity increases gradually toward an outer side of the reflecting surface of the micro mirror 101. Therefore, the contribution of a portion having a high reflectivity to the beam spot with no sticking out is small, and the contribution of a portion having a high reflectivity to the beam spot with sticking out is large. So it could be realize the wide passband with less ripple.

Figure 4A:
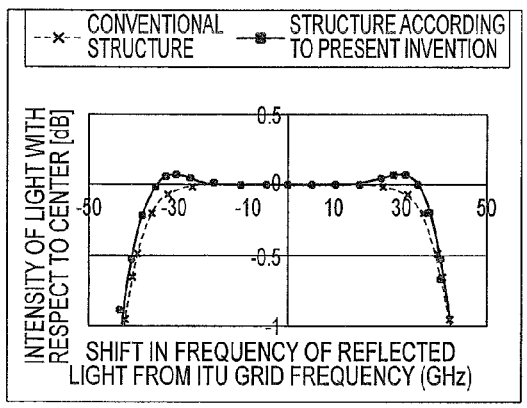
FIG. 4A, FIG. 4B, FIG. 4C, FIG. 4D, and FIG. 4E (hereinafter, 'FIG. 4A to FIG. 4E') are simulation results of frequency (wavelength) dependence of intensity of light reflected at the micro mirror corresponding to the modified embodiments of the first embodiment shown in diagrams from FIG. 3A to FIG. 3J.

In FIG. 4A, a simulation result of frequency (wavelength) dependence of intensity of light reflected at the reflecting surface of the micro mirror when the structure of the first modified embodiment of the first embodiment is used, is shown.

Parameters in simulation are as follows. The width of the micro mirror, the diameter of the beam spot at the reflecting surface of the micro mirror in the y-axis direction, and the distance between the centers of the adjacent micro mirrors are similar as in the first embodiment.

The reflectivity distribution in the reflecting surface of the micro mirror includes the (central) area 100 given by expression (15), the area 102 given by the expression (20), which includes the end portion of the reflecting surface of the micro mirror, and has a reflectivity higher than the central area 100, and the area 303 given by the expression (21) which is adjacent to the area 102, and the reflectivity is higher than the central area 100, and lower than the area 102.

$$-W/2 < y < -W/2 + \omega_y/2, W/2 - \omega_y/2 < y < W/2 \quad \text{(expression 20)}$$

$$-W/2 + \omega_y/2 < y < -W/2 + \omega_y, W/2 - \omega_y < y < W/2 - \omega_y/2 \quad \text{(expression 21)}$$

Relative reflectivity of the area 303 and the area 102 with respect to the reflectivity of the central area 100 is 1.12 and 1.05 respectively.

The abovementioned structure satisfies expression (1) and expression (2).

From FIG. 4A, it is revealed that, by decreasing the intensity loss of light reflected around the reflecting surface of the micro mirror, the passband is wider than conventional wavelength selective switch. Moreover, it is revealed that the ripple is small. Accordingly, it is possible to reduce the ripple in the passband which is generated due to the beam spot with no sticking out being reflected at the portion having high reflectivity.

Moreover, the first modified embodiment of the first embodiment may have the following arrangement.

As shown in FIG. 3B, an arrangement is made to be such that, each micro mirror 101 has an area 303 having a reflectivity lower than the central area 100, and being formed between the central area 100 and the area 102 having a reflectivity higher than the central area 100. The reflectivity distribution is discontinuous at the boundary of each of the central area 100, the area 303, and the area 102, and there is no in-area reflectivity distribution (the reflectivity is uniform) in each area (refer to FIG. 3G).

Moreover, a difference in the reflectivity in the areas is formed by controlling a film thickness of a metallic reflective film which has been formed on the reflecting surface of the micro mirror.

In this type of the first modified embodiment, an arrangement is made such that the reflectivity distribution satisfies expression (2) and expressions (3) and (4) which are shown below.

$$\overline{R}_2 < \overline{R}_1 < \overline{R}_3 \quad \text{(expression 3)}$$

$$|\overline{R}_2 - \overline{R}_1| \leq |\overline{R}_3 - \overline{R}_1| \quad \text{(expression 4)}$$

where, $\overline{R}_1$ denotes an average reflectivity of an area $$\left(0 < y < \frac{W}{2} - 2\omega_y\right)$$

(same as (Expression 8)) near the center of the reflecting surface of the micro mirror, $\overline{R}_2$ denotes an average reflectivity of area $$\left(B - 2\omega_y < y < \frac{W}{2} - \omega_y\right)$$

(this is let to be (Expression 17)) adjacent to the area near the center of the reflecting surface of the micro mirror, and $\overline{R}_3$ denotes an average reflectivity of an area $$\left(\frac{W}{2} - \omega_y < y < \frac{W}{2}\right)$$

Figure 6B:
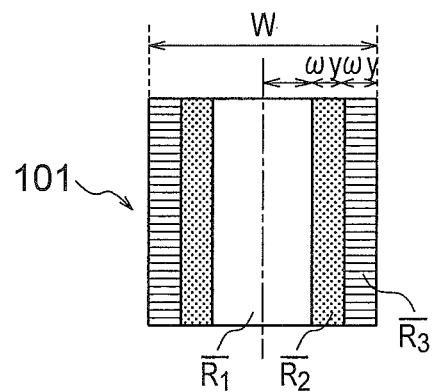

(this is let to be (Expression 18)) near the end portion of the reflecting surface of the micro mirror (FIG. 6B).

This type of the first modified embodiment of the first embodiment has the area 102 of the end portion of the reflecting surface of the micro mirror having the reflectivity higher than the central area 100, and the area 300 having the reflectivity lower than the central area 100. However, with the beam spot falling outside of the micro mirror, the contribution of high reflectivity of the area 102 becomes large. Therefore, intensity of reflected light of the beam spot which has been incident on the end portion of the reflecting surface of the micro mirror is counterbalanced by reduction of intensity due to falling out of the reflecting surface of the micro mirror, and increase of intensity due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

In this type of the first modified embodiment of the first embodiment, by providing the area 303 having the reflectivity lower than the central area 100, at an inner side of the area 102 having the reflectivity higher than the central area 100, it is possible to divide (distribute) the ripple in a direction in which, intensity of light becomes small and a direction in which, intensity of light becomes large with respect to the intensity of reflected light in a wavelength of the ITU grid. As a result, it is possible to achieve even more large wide passband effect almost without any ripple.

Figure 4D:
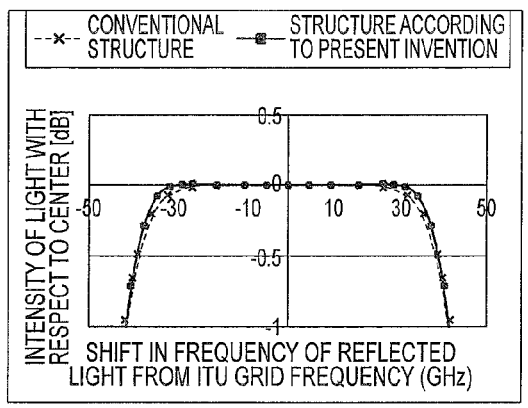
Figure 4B:
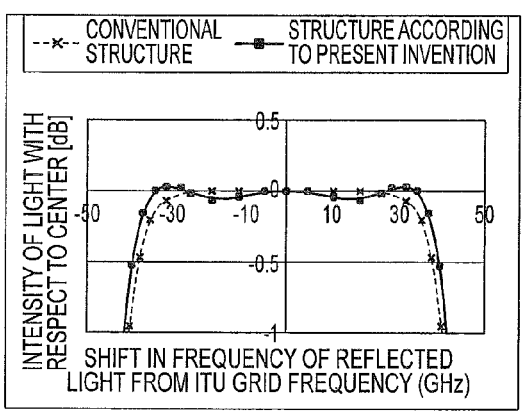

In FIG. 4B, a simulation result of frequency (wavelength) dependence of the intensity of light reflected at the reflecting surface of the micro mirror when the structure of this type of the first modified embodiment of the first embodiment is used, is shown.

Parameters in simulation are as follows. The width of the micro mirror, the diameter of the beam spot at the reflecting surface of the micro mirror in the y-axis direction, and the distance between the centers of the adjacent micro mirrors are similar as in the first embodiment.

The reflectivity distribution in the reflecting surface of the micro mirror includes the central area 100 given by the expression (22), the area 102 given by expression (16) and the area 303 given by the expression (23) which is adjacent to the area 102, and has the reflectivity smaller than the central area 100.

$$-W/2+\omega_y < y < W/2-2\omega_y \quad \text{(expression 22)}$$

$$-W/2+\omega_y < y < -W/2+2\omega_y, W/2-2\omega_y < y < W/2-\omega_y \quad \text{(expression 23)}$$

Relative reflectivity of the area 102 and the area 303 with respect to the reflectivity of the central area 100 is 1.12 and 0.96 respectively.

From FIG. 4B, it is revealed that, by decreasing the intensity loss of light reflected around the reflecting surface of the micro mirror, the passband is wider than conventional wavelength selective switch. Moreover, it is revealed that the ripple is divided in a direction in which, the intensity of light becomes small and in a direction in which, the intensity of light becomes large, and the ripple is further smaller than in the arrangement in FIG. 3A.

The description of the first modified embodiment (FIG. 3A and FIG. 3B) has been made by using three areas having different reflectivity. However, the arrangement may be made by using four or more areas. In this case, as compared to a case of having three areas, the reflectivity distribution can be designed minutely. Therefore, larger the number of areas, it is possible to achieve more large wide passband effect, almost without giving rise to any ripple.

Second Modified Embodiment of First Embodiment

A second modified embodiment of the first embodiment will be described below. An overall structure of a wavelength selective switch according to the second modified embodiment of the first embodiment is similar to the wavelength selective switch according to the first embodiment.

A micro mirror according to the second modified embodiment of the first embodiment will be described below by using FIG. 3C.

Each micro mirror 101 in the second modified embodiment of the first embodiment is formed to have an area 102 of the end portion of the reflecting surface of the micro mirror in the dispersive direction having a reflectivity higher than the central area 100. At a boundary of the central area 100 and the area 102, the reflectivity distribution is continuous, but not differentiable. Moreover, the reflectivity is uniform inside the central area 100, but in the area 102, an in-area reflectivity distribution is such that there is a monotonic increase toward the end of the micro mirror (refer to FIG. 3H). Moreover, a difference in the reflectivity in the areas is formed by controlling a film thickness of a metallic reflective film which is formed on the reflecting surface of the micro mirror 101.

Even in the second modified embodiment, the arrangement is made to be such that the reflectivity distribution satisfies expression (1) and expression (2).

For the second modified embodiment of the first embodiment to satisfy expression (1), since it has the area 102 at the end portion of the reflecting surface of the micro mirror having a reflectivity higher than the central area 100, when a bottom of the beam spot reaches to a position falling outside of the micro mirror, at least a part of the beam spot is reflected at the area 102. Therefore, intensity of light reflected of the beam spot incident on the end portion of the reflecting surface of the micro mirror is counterbalanced by reduction of intensity due to falling outside of the micro mirror, and increase of intensity due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

In the second modified embodiment of the first embodiment, the arrangement is such that by having the in-area reflectivity distribution within the area 102, the in-area reflectivity increases gradually toward an outer side of the reflecting surface of the micro mirror 101. Therefore, it is possible to design and set a structure in which, the contribution of a portion having a high reflectivity to the beam spot with no sticking out is small, and the contribution of a portion having a high reflectivity to the beam spot with sticking out is large, with a higher design flexibility than for the structure in FIG. 3A. Accordingly, it is possible to further reduce the ripple in the passband generated due to the beam spot with no sticking out being reflected at the high-reflectivity area, than in the structure in FIG. 3A.

Figure 4E:
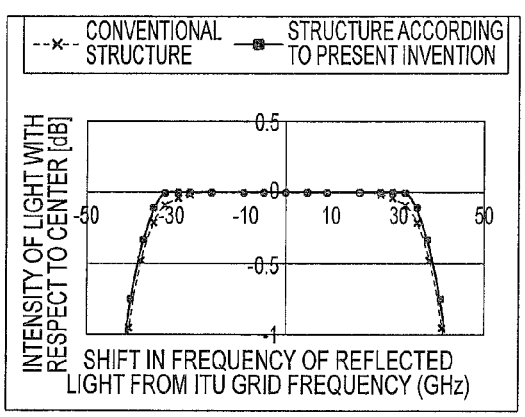
Figure 4C:
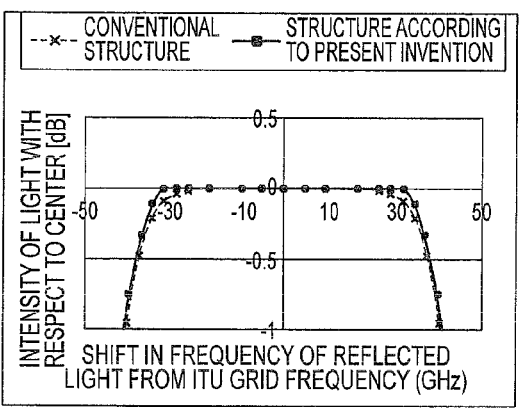

In FIG. 4C, a simulation result of frequency (wavelength) dependence of intensity of light reflected at the reflecting surface of the micro mirror when the structure of the second modified embodiment of the first embodiment is used, is shown.

From FIG. 4C, it is revealed that, by decreasing the intensity loss of light reflected around the reflecting surface of the micro mirror, the passband is wider than conventional wavelength selective switch. Moreover, it is revealed that the ripple is small.

The second modified embodiment of the first embodiment can be let to have the following arrangement.

As shown in FIG. 3D, an arrangement is made to be such that, each micro mirror 101 has a central area 100 of the reflecting surface of the micro mirror and an area 304 which has a portion 303 having a reflectivity lower than the reflectivity of the central portion 100 and another portion 102 having a reflectivity higher than the central area 100 in the end portion of the reflecting surface of the micro mirror in the dispersive direction. The portion 102 is provided toward the end portion of the reflecting surface of the micro mirror, than the portion 303. At a boundary of the central area 100 and the area 304, the reflectivity distribution is discontinuous. The reflectivity is uniform inside the central area 100 but, inside of the area 304 an in-area reflectivity distribution is such that it increases monotonically toward the end of the reflecting surface of the micro mirror (refer to FIG. 3I).

In the second modified embodiment of the first embodiment, an arrangement is made such that the reflectivity distribution satisfies expression (2), expression (3), and expression (4).

The second modified embodiment of the first embodiment has the portion 102 of the end portion of the reflecting surface of the micro mirror having a reflectivity higher than the central area 100, and the portion 303 having a reflectivity lower than the central area 100. However, with the beam spot falling outside of the micro mirror, the contribution of high reflection at the portion 102 becomes larger than the contribution of low reflection at the portion 303. Therefore, intensity of reflected light of the beam spot which is incident on the end portion of the reflecting surface of the micro mirror is counterbalanced by reduction of intensity due to falling outside of the micro mirror, increase of intensity due to reflection at the portion 102, and as a result, difference between intensity of light reflected at an end portion of the reflecting surface of the micro mirror and intensity of the light reflected at the central area 100 could be less than the conventional wavelength selective switch, and it is possible to widen the width of the passband.

In the second modified embodiment of the first embodiment, by providing the portion 303 having the reflectivity lower than the central area 100, at an inner side of the end portion of the reflecting surface of the micro mirror having the reflectivity higher than the central area 100, it is possible to distribute the ripple in a direction in which intensity of light becomes small, and a direction in which, intensity of light becomes large with respect to intensity of reflected light in a wavelength of the ITU grid. As a result, it is possible to have even more large wide passband effect almost without any ripple. Moreover, by imparting in-area reflectivity distribution inside the area 304, it is possible to carry out the control of the passband including the ripple as well, with design flexibility higher than for the arrangement in FIG. 3B.

In FIG. 4D, a simulation result of frequency (wavelength) dependence of the intensity of light reflected at the reflecting surface of the micro mirror when the structure of the second modified embodiment of the first embodiment is used, is shown.

Parameters in simulation are as follows. The width of the micro mirror, the diameter of the beam spot at the reflecting surface of the micro mirror in the y-axis direction, and the distance between the centers of the adjacent micro mirrors are similar as in the first embodiment.

The reflectivity distribution in the surface of the micro mirror is formed by the central area 100 which includes the center of the reflecting surface of the micro mirror, and is shown by the following expression (24), and an area 304 which includes the end portion of the reflecting surface of the micro mirror, and is shown by the following expression (25).

$$-W/2+3\omega_y/2 < y < W/2-3\omega_y/2 \quad \text{(expression 24)}$$

$$-W/2 < y < -W/2+3\omega_y/2, W/2-3\omega_y/2 < y < W/2 \quad \text{(expression 25)}$$

In-area reflectivity distribution inside the area 304 is imparted by a linear function which increases toward the end portion of the reflecting surface of the micro mirror. A lower limit and an upper limit of the reflectivity of the area 304 with respect to the reflectivity of the central area 100 are 0.96 and 1.12 respectively.

From FIG. 4D, it is revealed that, by decreasing the intensity loss of light reflected at the end portion of the reflecting surface of the micro mirror, the passband is wider than conventional wavelength selective switch. Moreover, it is revealed that the ripple is divided in a direction in which the intensity of light becomes small and in a direction in which the intensity of light becomes large, and that the ripple can be small.

Moreover, the second modified embodiment of the first embodiment can be let to have the following arrangement.

As shown in FIG. 3E, an arrangement is made to be such that, each micro mirror 101 has an area 303 having a reflectivity lower than the central area 100, and being formed between the central area 100 and the area 102 having a reflectivity higher than the central area 100. At a boundary of each of the central area 100, the area 303, and the area 102, the reflectivity distribution is continuous, but not differentiable. Moreover, the reflectivity is uniform inside the central area but, inside the area 303, the in-area reflectivity distribution decreases monotonically toward the end of the micro mirror, and inside the area 102, the in-area reflectivity distribution increases monotonically toward the end of the micro mirror (Refer to FIG. 3J). Moreover, a difference in the reflectivity in the areas is formed by controlling the film thickness of a metallic reflective film which is formed on the reflecting surface of the micro mirror.

In this type of the second modified embodiment of the first embodiment, an arrangement is made to be such that the reflectivity distribution satisfies expression (2), expression (3), and expression (4).

This type of the second modified embodiment has the area 102 of the end portion of the micro mirror having a reflectivity higher than the central area 100, and the area 303 having a reflectivity lower than the central area 100. However, with the beam spot falling outside of the reflecting surface of the micro mirror, the contribution of high reflectivity at the area 102 becomes large. Therefore, intensity of reflected light of the beam spot which is incident on the end portion of the reflecting surface of the micro mirror is counterbalanced by reduction of intensity due to falling out of the reflecting surface of the micro mirror, and increase of intensity due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

In this type of the second modified embodiment, by providing the area 303 having the reflectivity lower than the central area 100, at an inner side of the end portion of the reflecting surface of the micro mirror having the reflectivity higher than the central area 100, it is possible to divide the ripple in a direction in which the intensity of light becomes small, and a direction in which, the intensity of light becomes large with respect to the intensity of reflected light in a wavelength of the ITU grid. As a result, it is possible to achieve even more large wide passband effect almost without any ripple. Moreover, by the in-area reflectivity distribution inside the area 304 working as a continuous distribution, it is possible to reduce an effect such as diffraction at the boundary, which is not shown in the diagram.

In FIG. 4E, a simulation result of frequency (wavelength) dependence of the intensity of light reflected at the reflecting surface of the micro mirror when the structure of this type of the second modified embodiment is used, is shown.

Parameters in simulation are as follows. The width of the micro mirror, the diameter of the beam spot at the reflecting surface of the micro mirror in the y-axis direction, and the distance between the centers of the adjacent micro mirrors are similar as in the first embodiment.

The reflectivity distribution in the reflecting surface of the micro mirror includes the central area 100 given by the expression (15), the area 102 given by expression (16), which includes the end portion of the reflecting surface of the micro mirror, and which has a reflectivity higher than the central area 100, and the area 303 given by expression (23), which is adjacent to the area 102, and which has a reflectivity higher than the reflectivity of the area 100.

In-area reflectivity distribution inside the area 303 is imparted by a linear function which becomes smaller toward the end portion of the micro mirror. A lower limit and an upper limit of the reflectivity of the area 303 with respect to the reflectivity of the central area 100 are 0.96 and 1.0 respectively.

In-area reflectivity distribution inside the area 102 is imparted by a linear function which increases toward the end portion of the micro mirror. A lower limit and an upper limit of the reflectivity of the area 102 with respect to the reflectivity of the central area 100 are 0.96 and 1.12 respectively.

From FIG. 4E, it is revealed that, by decreasing the intensity loss of light reflected around the reflecting surface of the micro mirror, the passband is wider than conventional wavelength selective switch. Moreover, it is revealed that the ripple is divided in a direction in which the intensity of light becomes small and in a direction in which the intensity of light becomes large, and that the ripple is smaller.

In the first embodiment described above, coupling of light from one input port to a plurality of output ports has been explained. It is also possible to carry out coupling from a plurality of input ports to one output port.

In the wavelength selective switch of the first embodiment described above, an optical system (converging element) which is between a dispersive element 503 and a light deflecting member 505 was the lens 504. However, it may be let to be a reflecting optical system not shown in the diagram.

In the first embodiment described above, imparting of the reflectivity distribution in the micro mirror was let to be a film thickness distribution of the metallic reflective film. However, the reflectivity distribution may be imparted by changing partially a material of the metallic thin film, or by providing an increased-reflection film at a high-reflectivity area (location), or by providing a reflection attenuation film at a low-reflectivity area, or by changing a design of a dielectric multilayer film according to an area.

In the first embodiment described above, the reflectivity distribution inside the micro mirror has been symmetric about the center of the micro mirror in dispersive direction. However, the reflectivity distribution may be asymmetric, or a high reflectivity distribution portion may be provided only at an end portion on one side in the dispersive direction.

Second Embodiment

An overall structure of a wavelength selective switch according to a second embodiment is similar to the wavelength selective switch according to the first embodiment.

Next, a micro mirror according to the second embodiment will be described below.

Figure 7A:
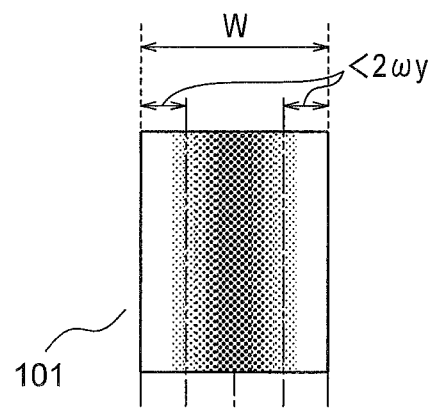
FIG. 7A, FIG. 7B, FIG. 7C, and FIG. 7D (hereinafter, 'FIG. 7A to FIG. 7D') are diagrams for describing an example of a structure of a micro mirror (an example of a case in which, a reflectivity distribution is differentiable without having discontinuous point (a point of discontinuity) in the reflectivity distribution) according to a second embodiment.

As shown in FIG. 7A, in the second embodiment, each micro mirror 101 does not have a discontinuous point in the reflectivity distribution on the overall reflecting surface of the micro mirror, and the reflectivity distribution is differentiable. The overall reflecting surface has a reflectivity distribution such that the reflectivity distribution increases gradually from the center of the reflecting surface of the micro mirror toward the end portion of the reflecting surface of the micro mirror, in the dispersive direction (y-axis direction). Moreover, a difference in the reflectivity in each of the areas is formed by controlling a film thickness of a metallic reflective film which is formed on a reflecting surface of the micro mirror. A continuous film-thickness distribution of the metallic reflective film can be prepared by a combination of an etching process and a photo lithography using a gradation mask.

Even in the second embodiment, the reflectivity distribution is to be formed to satisfy expression (1) and expression (2).

In the second embodiment, for satisfying expression (1), the reflectivity distribution increases monotonically toward the end portion of the reflecting surface of the micro mirror. Therefore, an average reflectivity in a beam spot which is incident at a position at which a bottom of the beam spot falls outside of the reflecting surface of the micro mirror becomes higher as compared to an average reflectivity in the beam spot which incident at the center of the reflecting surface of the micro mirror. Therefore, intensity of light reflected of the beam spot incident on the end portion of the reflecting surface of the micro mirror is counterbalanced by reduction of intensity due to falling outside of the reflecting surface of the micro mirror and increase of intensity due to reflection with high average reflectivity. As a result, difference between intensity of light reflected at the an end portion of the reflecting surface of the micro mirror and intensity of light reflected at the center of the reflecting surface of the micro mirror could be less than the conventional wavelength selective switch, and it is possible to widen the width of the passband.

In the second embodiment, an arrangement is such that the reflectivity increases toward an outer side of the reflecting surface of the micro mirror 101. Therefore, the second embodiment can have an arrangement in which, the contribution of a portion having a high reflectivity to the beam spot with not sticking out is small, and the contribution of a portion having a high reflectivity to the beam spot with sticking out is large. So it could be realize the wide passband with less ripple. Moreover, the reflectivity distribution being continuous at the overall reflecting surface of the micro mirror, it is possible to design with a higher flexibility than in the arrangement in FIG. 3A. Accordingly, it is possible to reduce further the ripple in the passband which is generated by the beam spot without sticking out being reflected at an area having a high reflectivity, than in the arrangement in FIG. 3A.

Moreover, since the reflectivity distribution is defined by a differentiable continuous function, designing of reflectivity distribution with higher flexibility is possible. Also, it is possible to impart a smooth reflectivity distribution for a beam spot which is incident at any position on the reflecting surface of the micro mirror, and it is possible to reduce an effect such as diffraction which is not shown in the diagram, even more than in the second modified embodiment of the first embodiment shown in FIG. 3C.

Figure 8A:
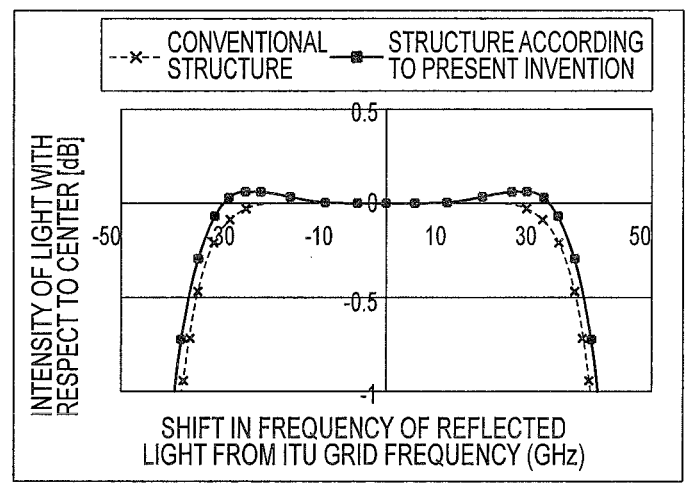
FIG. 8A and FIG. 8B are simulation results of frequency (wavelength) dependence of intensity of reflected light at a micro mirror corresponding to the example of structure shown in FIG. 7A and FIG. 7B.

In FIG. 8A, a simulation result of frequency (wavelength) dependence of intensity of light reflected at the micro mirror when the structure of the second embodiment is used, is shown. With the beam spot passing toward the end portion of the micro mirror, a local reflectivity of the micro mirror becomes higher. Therefore, it can be verified that the intensity of falling of the intensity of light reflected around the micro mirror is smaller than in the conventional structure.

First Modified Embodiment of Second Embodiment

A first modified embodiment of the second embodiment will be described below.

Figure 7B:
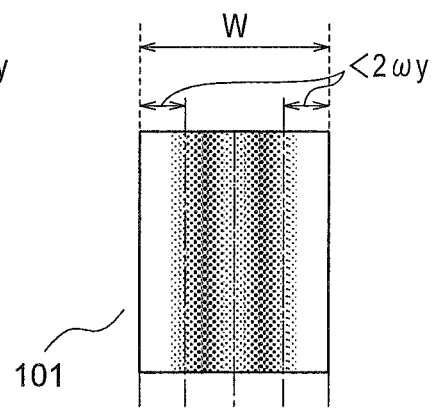
Figure 7C:
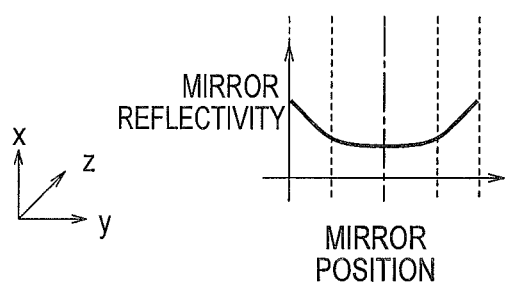
Figure 7D:
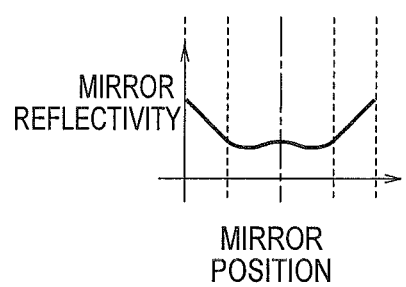

As shown in FIG. 7B, each micro mirror 101 does not have a discontinuous point in the reflectivity distribution on the overall reflecting surface of the micro mirror, and the reflectivity distribution is differentiable. Moreover, the local reflectivity distribution is such that, the reflectivity distribution is higher at the end portion of the reflecting surface of the micro mirror than at the center of the reflecting surface of the micro mirror, and at a position toward the center of the reflecting surface of the micro mirror with respect to the end portion of the reflecting surface of the micro mirror, there is a portion having a lower reflectivity distribution than the center of the reflecting surface of the micro mirror. A difference in the reflectivity in the reflecting surface is formed by controlling a film thickness of a metallic reflective film which has been formed on the reflecting surface of the micro mirror.

In the first modified embodiment of the second embodiment, an arrangement is made to be such that the reflectivity distribution satisfies expression (2), expression (3), and expression (4).

The first modified embodiment of the second embodiment has a portion at the end portion of the reflecting surface of the micro mirror having a reflectivity higher than the center of the reflecting surface of the micro mirror, and a portion having a reflectivity lower than the center of the reflecting surface of the micro mirror. However, with the beam spot falling out of the micro mirror, the contribution of portion having a high reflectivity of the end portion of the reflecting surface of the micro mirror becomes large. Therefore, intensity of light reflected at the end portion of the reflecting surface of the micro mirror is counterbalanced by reduction of intensity due to falling out of the micro mirror, and increase of intensity due to high reflectivity of the end portion of the reflecting surface of the micro mirror, and as a result, difference between intensity of light reflected at the an end portion of the reflecting surface of the micro mirror and intensity of light reflected at the center of the reflecting surface of the micro mirror could be less than the conventional wavelength selective switch, and it is possible to widen (increase) the width of the passband.

In the first modified embodiment of the second embodiment, by providing the portion having the reflectivity lower than the center of the reflecting surface of the micro mirror, at an inner side of the portion of the end portion of the reflecting surface of the micro mirror having the reflectivity higher than the reflecting surface of the center of the micro mirror, it is possible to divide the ripple in a direction in which, intensity of light becomes small and a direction in which, intensity of light becomes large with respect to the intensity of reflected light in a wavelength of the ITU grid. As a result, it is possible to achieve wide passband almost without giving rise to any ripple. Moreover, by allowing the continuous reflectivity distribution within the reflecting surface of the micro mirror, it is possible to carry out the division of the ripple with higher design flexibility. Furthermore, it is possible to have a smooth reflectivity distribution for a beam spot which is incident at any position on the reflecting surface of the micro mirror, and to reduce further an effect such as diffraction which is not shown in the diagram, than in the second modified embodiment of the first embodiment shown in FIG. 3A.

Figure 8B:
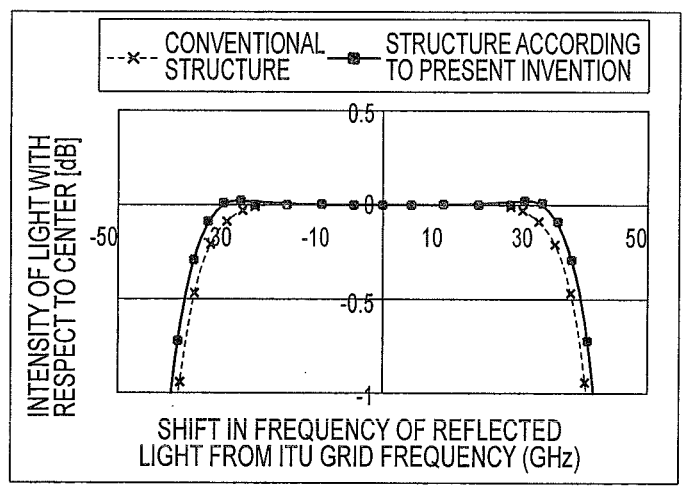
Figure 9:
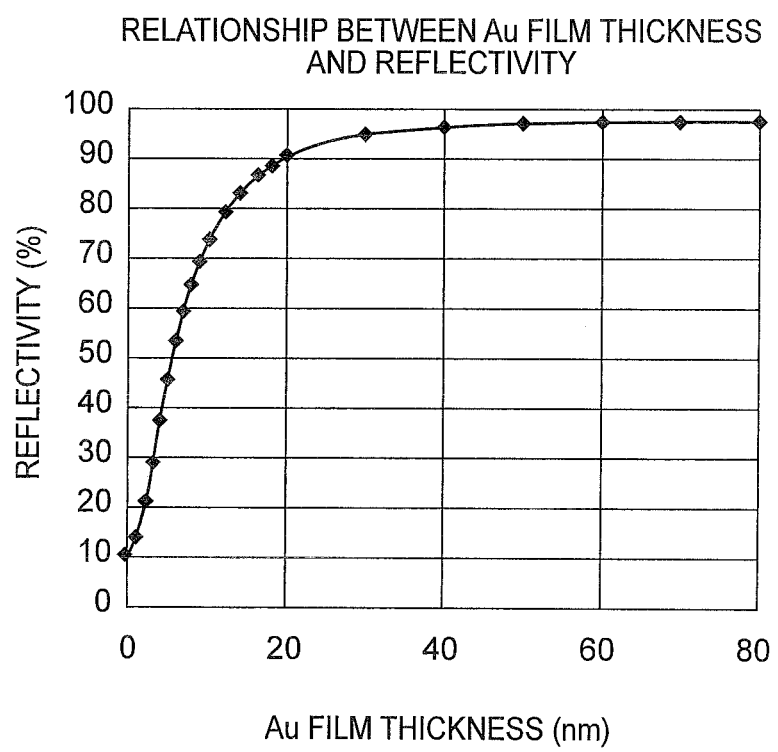
FIG. 9 is a diagram in which, an example of a relationship between an Au film thickness and a reflectivity is shown.

In FIG. 8B, a simulation result of frequency (wavelength) dependence of intensity of light reflected at the reflecting surface of the micro mirror when the structure of the first modified embodiment of the second embodiment is used, is shown.

It shows that the passband is wider than conventional wavelength selective switch, because the intensity loss of light reflected at the end portion of the reflecting surface of the micro mirror is less than the conventional structure. Moreover, it shows that the ripple is reduced to be small due to the portion, which is formed in the position toward the center of the reflecting surface of the micro mirror with respect to the end portion of the reflecting surface of the micro mirror, having the reflectivity lower than the reflectivity of the center of the reflecting surface of the micro mirror.

In the second embodiment, imparting of the reflectivity distribution in the reflecting surface of the micro mirror was let to be a film thickness distribution of the metallic reflective film. However, the reflectivity distribution may be imparted by changing partially a material of the metallic thin film, or by providing an increased-reflection film at a high-reflectivity portion, or by providing a reflection attenuation film at a low-reflectivity portion, or by changing a design of a dielectric multilayer film according to a portion.

In the second embodiment, the reflectivity distribution inside the reflecting surface of the micro mirror has been symmetric about the center of the micro mirror in dispersive direction. However, the reflectivity distribution may be asymmetric, or a high reflectivity distribution portion may be provided only at an end portion on one side in the dispersive direction.

Third Embodiment

An overall structure of a wavelength selective switch according to a third embodiment is similar to the wavelength selective switch according to the first embodiment.

Figure 12A:
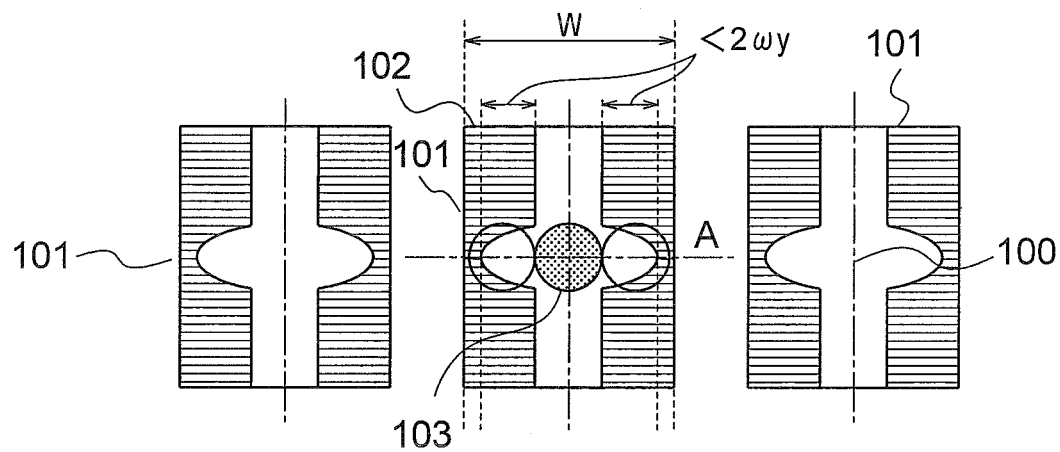
FIG. 12A, FIG. 12B, and FIG. 12C (hereinafter, 'FIG. 12A to FIG. 12C') are diagrams for describing an example of a structure of a micro mirror (an example of a case of having a two dimensional reflectivity distribution (not restricted to a dispersive direction)) according to a third embodiment of the present invention.
Figure 12B:
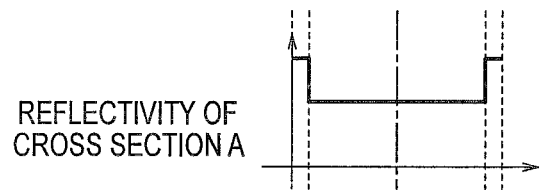

Next, a micro mirror of the third embodiment will be described below by using FIG. 12A, FIG. 12B, and FIG. 12C.

In the third embodiment, each micro mirror 101 has two dimensional reflectivity distribution which is not restricted to the dispersive direction. As shown in FIG. 12A, an arrangement is made to have a central area 100 which includes a rectangular-shaped area and an elliptical-shaped area, and an area 102 having a reflectivity higher than the central area 100, at an end portion of the reflecting surface of the micro mirror. At a boundary of the central area 100 and the area 102, the reflectivity is discontinuous. Moreover, there is no in-area reflectivity distribution inside each area (the reflectivity is uniform). A difference of the reflectivity in areas is formed by controlling a film thickness of a metallic reflective film which is formed on a reflecting surface of the micro mirror.

In the third embodiment, an arrangement is made to be such that the reflectivity distribution satisfies expression (2) and the following expression (5).

$$\tilde{R}_1 < \tilde{R}_2 \qquad \text{(expression 5)}$$

where, $\tilde{R}(y)$ is a reflectivity subjected to weighted average in a direction orthogonal to the dispersive direction and is given by $$\tilde{R}(y) = \frac{\int_{-\frac{D}{2}}^{\frac{D}{2}} R(x, y) \cdot \exp\left(\frac{-x^2}{2\sigma_x^2}\right) dx}{\int_{-\frac{D}{2}}^{\frac{D}{2}} \exp\left(\frac{-x^2}{2\sigma_x^2}\right) dx}$$

... (this is let to expression (19))

where, $\overline{\tilde{R}}_1$ is an average of a weighted average reflectivity of an area $$\left(0 < y < \frac{W}{2} - 2\omega_y\right)$$

(this is same as expression (8)) near the center of the micro mirror, and $\overline{\tilde{R}}_2$ is an average of a weighted average reflectivity of an area $$\left(\frac{W}{2} - 2\omega_y < y < \frac{W}{2}\right)$$

Figure 6C:
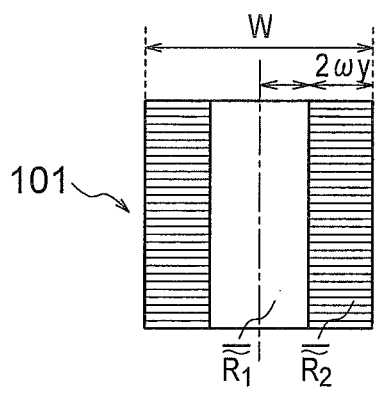

(this is same as expression (9)) near the end portion of the micro mirror (FIG. 6C).

$\tilde{R}(y)$ of expression (5) will be described below.

In the third embodiment, the reflectivity distribution inside the reflecting surface of the micro mirror is two dimensional distribution and spread over the overall surface of the micro mirror. An intensity distribution of a beam which is reflected on the surface of the micro mirror is Gaussian, the intensity of the beam which is incident on the center of the micro mirror in a direction (x-axis direction) orthogonal to the dispersive direction is the maximum, and as moving away from the center (in the direction), the intensity of the beam decreases gradually. Therefore, the contribution of the local reflectivity with respect to intensity of light returning from the micro mirror, in the x-axis direction, is the maximum at the center of the reflecting surface of the micro mirror, and decreases gradually as moving away from the center of the micro mirror. Since a rate of decrease of the contribution is determined by an intensity distribution of light which is incident, when the reflectivity distribution is spread over the overall surface as in the third embodiment, a simple arithmetic mean is insufficient, and it is necessary to use a reflectivity which has been subjected to weighted average in the x-axis direction given by expression (19).

The third embodiment, in order to satisfy expression (5), has the area 102 of the end portion of the reflecting surface of the micro mirror having the reflectivity higher than the central area 100. Therefore, when a bottom of the beam spot reaches to a position of falling out of the micro mirror, at least a part of the beam spot is reflected at the area 102. Therefore, intensity of reflected light of the beam spot incident on the end portion of the reflecting surface of the micro mirror is counterbalanced by reduction of intensity due to falling outside of the micro mirror and increase of intensity due to reflection at the area 102. As a result, difference between intensity of light reflected at the end portion of the reflecting surface of the micro mirror and intensity of light reflected at the central area of the reflecting surface of the micro mirror could be less than the conventional wavelength selective switch.

Figure 12C:
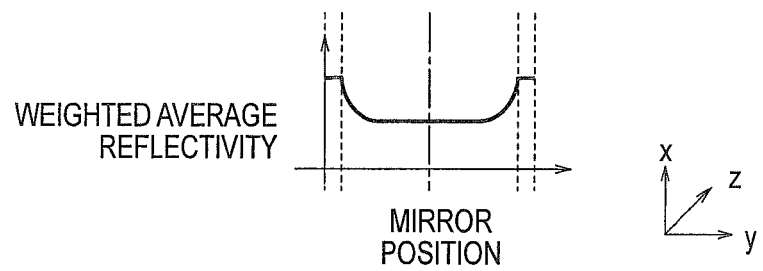

It is revealed that when the reflectivity which is subjected to the weighted average in the x-direction is used, the reflectivity which has been subjected to the weighted average in (on) reflecting surface of each micro mirror increases gradually from the center of the reflecting surface of the micro mirror toward the end portion of the reflecting surface of the micro mirror (refer to FIG. 12C). In this manner, even when the reflectivity of each area is constant, it is possible to make an arrangement such that the weighted average reflectivity rises (increases) continuously toward the end portion of the reflecting surface of the micro mirror. Therefore, as compared to a case of having the reflectivity distribution only in the dispersive direction, it is possible to suppress the ripple with a simple structure.

Figure 16A:
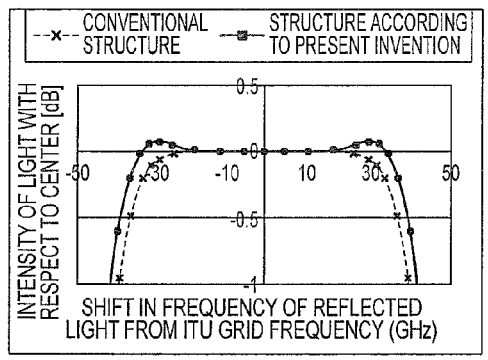
FIG. 16A, FIG. 16B, FIG. 16C, FIG. 16D, FIG. 16E, FIG. 16F, and FIG. 16G (hereinafter, 'FIG. 16A to FIG. 16G') are simulation results of frequency (wavelength) dependence of intensity of light reflected at a micro mirror corresponding to the modified embodiments of the third embodiment is shown.

In FIG. 16A, a simulation result of frequency (wavelength) dependence of intensity of light reflected at the reflecting surface of the micro mirror when the structure of the third embodiment is used, is shown.

It is revealed, that with the beam spot passing toward the end portion of the reflecting surface of the micro mirror, reduction of the intensity of the light reflected around the micro mirror is small by the reflectivity subjected to the weighted average in the x-axis direction of the micro mirror becoming large.

It is clear that even when the central area 100 includes only an elliptical-shaped area (does not include the rectangular-shaped area), the similar effect is shown.

First Modified Embodiment of Third Embodiment

A first modified embodiment of the third embodiment will be described below.

An overall structure of a wavelength selective switch according to the first modified embodiment of the third embodiment is similar as the wavelength selective switch according to the first embodiment.

Figure 13A:
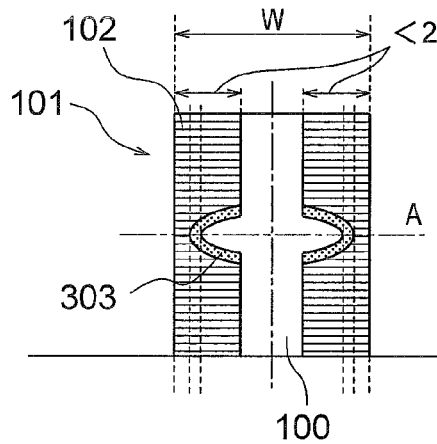
FIG. 13A, FIG. 13B, FIG. 13C, FIG. 13D, FIG. 13E, and FIG. 13F (hereinafter, 'FIG. 13A to FIG. 13F') are diagrams for describing examples of a structure of a micro mirror according to a first group of modified embodiments of the third embodiment.

A micro mirror of the first modified embodiment of the third embodiment will be described below by using FIG. 13A.

Each micro mirror in the first modified embodiment of the third embodiment includes an area 303 having a reflectivity higher than a central area 100 and lower than an area 102, and the area 303 is formed between the central area 100 and the area 102. At each boundary of the central area 100, the area 303, and the area 102, the reflectivity distribution is discontinuous, and there is no in-area reflectivity distribution in each area (the reflectivity is uniform) (refer to FIG. 13C). Moreover, a difference of reflectivity in the areas is formed by controlling a film thickness of a metallic reflective film which has been formed on the reflecting surface of the micro mirror.

In the first modified embodiment of the third embodiment, an arrangement is made to be such that the reflectivity distribution satisfies expression (2) and expression (5).

For the first modified embodiment of the third embodiment, to satisfy expression (5), since it has the area 102 of the end portion of the reflecting surface of the micro mirror having the reflectivity higher than the central area 100, and the area 303 having the reflectivity higher than the central area 100 and lower than the area 102. Therefore, when a bottom of a beam spot reaches to a position of falling out from the reflecting surface of the micro mirror, at least a part of the beam spot is reflected at the area 102. Therefore, intensity of reflected light of the beam spot incident on the end portion of the reflecting surface of the micro mirror is counterbalanced by reduction of intensity of light due to falling outside of the micro mirror, and increase of intensity of light due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

In the first modified embodiment of the third embodiment, an arrangement is made such that an area having a high local reflectivity is directed toward an outer side of the micro mirror. Therefore, there is an increase in a design flexibility for controlling the weighted average reflectivity. Moreover, it is possible to have an arrangement in which, the contribution of the portion having a high reflectivity to the beam spot with no sticking out is small, and the contribution of the portion having a high reflectivity to the beam spot with sticking out is large.

Figure 16E:
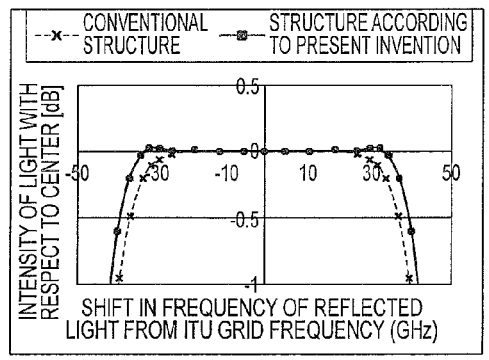
Figure 16B:
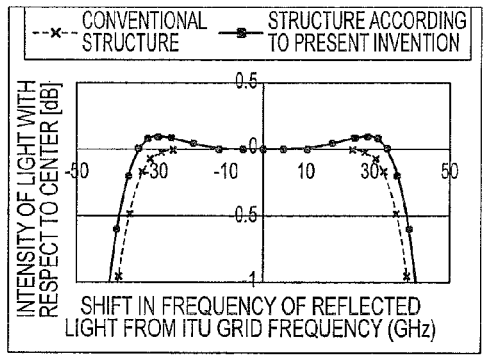

In FIG. 16B, a simulation result of frequency (wavelength) dependence of intensity of light reflected at the micro mirror when the structure of the first modified embodiment of the third embodiment is used, is shown.

It is revealed that, it is revealed that, by decreasing the intensity loss of light reflected around the reflecting surface of the micro mirror, the passband is wider than conventional wavelength selective switch. Moreover, it is revealed that the ripple is small.

Moreover, the first modified embodiment of the third embodiment may have the following arrangement.

Figure 13B:
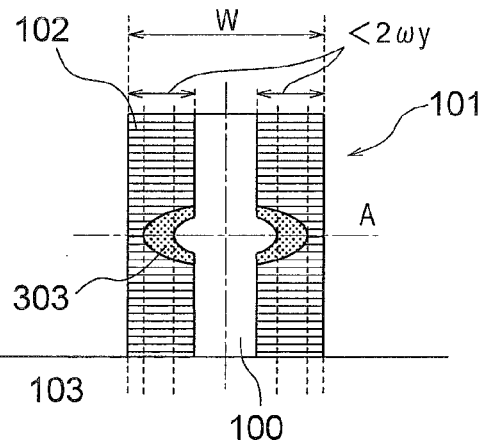
Figure 13C:
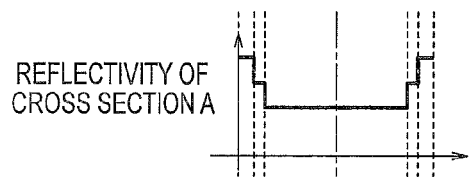
Figure 13D:
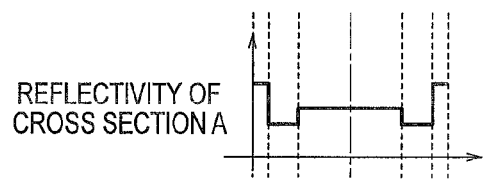
Figure 13E:
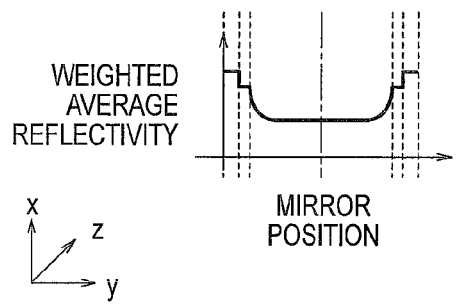
Figure 13F:
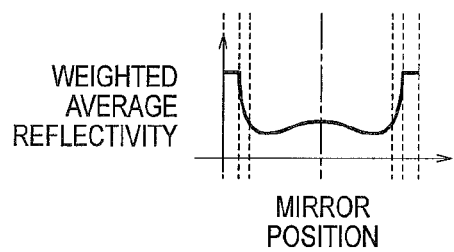

As shown in FIG. 13B, an arrangement is made to be such that, each micro mirror has an area 303 having a reflectivity lower than the central area 100, and the area 303 is formed between the central area 100 and the area 102 of the end portion of the reflecting surface of the micro mirror in a dispersive direction having a reflectivity higher than the central area 100. The reflectivity distribution is discontinuous at the boundary of each of the central area 100, the area 303, and the area 102, and there is no in-area reflectivity distribution (the reflectivity is uniform) in each area (refer to FIG. 13D). Moreover, a difference in the reflectivity in the areas is formed by controlling a film thickness of a metallic reflective film which as been formed on the reflecting surface of the micro mirror.

In this type of the first modified embodiment of the third embodiment, an arrangement is made such that the reflectivity distribution satisfies expression (2), and expression (6) and expression (7) shown below.

$$\widetilde{R}_2 < \widetilde{R}_1 < \widetilde{R}_3 \qquad \text{(expression 6)}$$

$$|\widetilde{R}_2 - \widetilde{R}_1| \le |\widetilde{R}_3 - \widetilde{R}_1| \qquad \text{(expression 7)}$$

where, $\widetilde{R}_1$ denotes an average of a weighted average reflectivity of an area $$\left(0 < y < \frac{W}{2} - 2\omega_y\right)$$

(this is same as Expression (8)) near the center of the reflecting surface of the micro mirror, $\widetilde{R}_2$ denotes an average of a weighted average reflectivity of an adjacent area $$\left(\frac{W}{2} - 2\omega_y < y < \frac{W}{2} - \omega_y\right)$$

(this is same as expression (17)) near the center of the reflecting surface of the micro mirror, and $\widetilde{R}_3$ denotes an average of a weighted average reflectivity of an area $$\left(\frac{W}{2} - \omega_y < y < \frac{W}{2}\right)$$

Figure 6D:
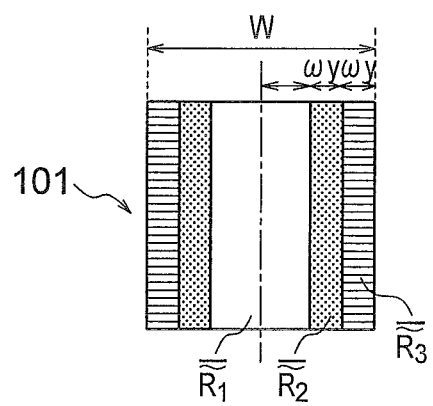

(this is same as expression (18)) near the end portion of the reflecting surface of the micro mirror (FIG. 6D).

This type of the first modified embodiment of the third embodiment has the area 102 of the end portion of the micro mirror having a reflectivity higher than the central area 100, and the area 303 having a reflectivity lower than the central area 100. However, with the beam spot falling out of the micro mirror, the contribution of high reflection at the area 102 becomes large. Therefore, intensity of reflected light of the beam spot which is incident on the end portion of the reflecting surface of the micro mirror is counterbalanced by reduction of intensity of light due to falling outside of the reflecting surface of the micro mirror, and increase of intensity of light due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

Moreover, in this type of the first modified embodiment of the third embodiment, by providing the area 303 having the reflectivity lower than the central area 100, at an inner side of the end portion of the reflecting surface of the micro mirror having the reflectivity higher than the central area 100, it is possible to divide the ripple in a direction in which, intensity of light becomes small, and a direction in which, intensity of light becomes large with respect to the intensity of reflected light in a wavelength of the ITU grid. As a result, it is possible to widen the wide passband almost without any ripple.

Figure 16F:
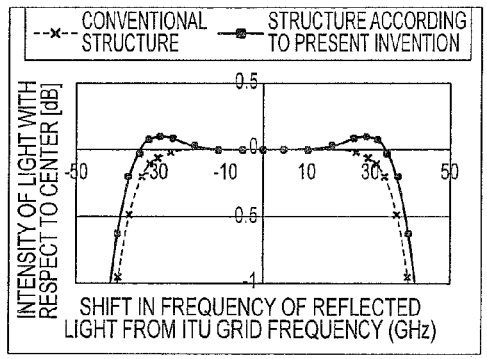
Figure 16C:
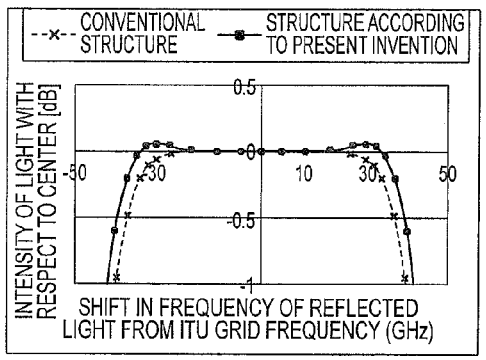

In FIG. 16C, a simulation result of frequency (wavelength) dependence of the intensity of light reflected at the reflecting surface of the micro mirror when the structure of this type of the first modified embodiment of the third embodiment is used, is shown.

It is revealed that, it is revealed that, by decreasing the intensity loss of light reflected around the reflecting surface of the micro mirror, the passband is wider than conventional wavelength selective switch. Moreover, it is revealed that the ripple is divided in a direction in which, the intensity of light becomes small, and in a direction in which, the intensity of light becomes large, and the ripple is small.

In the first modified embodiment (FIG. 13A and FIG. 13B) of the third embodiment, the description has been made by using three areas having different reflectivity. However, the arrangement may be made by using four or more areas. In this case, as compared to a case of having three areas, there is a rise in a design flexibility of setting the reflectivity, and it is possible to achieve more large wide passband effect, almost without giving rise to any ripple.

Second Modified Embodiment of Third Embodiment

A second modified embodiment of the third embodiment will be described below.

An overall structure of a wavelength selective switch according to the second modified embodiment of the third embodiment is similar to the wavelength selective switch according to the first embodiment.

Figure 14A:
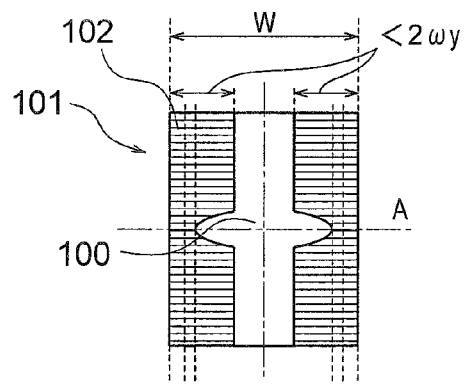
FIG. 14A, FIG. 14B, FIG. 14C, FIG. 14D, FIG. 14E, and FIG. 14F (hereinafter, 'FIG. 14A to FIG. 14F') are diagrams for describing examples of a structure of a micro mirror according to a second group of modified embodiments of the third embodiment.

A micro mirror according to the second modified embodiment of the third embodiment will be described below by using FIG. 14A.

Each micro mirror 101 in the second modified embodiment of the third embodiment is formed to have an area 102 of an end portion of the reflecting surface of the micro mirror in a dispersive direction having a reflectivity higher than a central portion 100, having two dimensional in-area reflectivity distribution, not restricted to a dispersive direction. At a boundary of the central area 100 and the area 102, the reflectivity distribution is continuous, but not differentiable. Moreover, there is no in-area reflectivity distribution inside the central area (the reflectivity is uniform), but in the area 102, an in-area reflectivity distribution is such that there is a monotonic increase toward the end of the reflecting surface of the micro mirror (refer to FIG. 14C). Moreover, a difference in the reflectivity in the areas is formed by controlling a film thickness of a metallic reflective film which has been formed on the reflecting surface of the micro mirror 101.

Even in the second modified embodiment of the third embodiment, the arrangement is made to be such that the reflectivity distribution satisfies expression (2) and expression (5).

For the second modified embodiment of the third embodiment to satisfy expression (5), it has the area 102 of the end portion of the reflecting surface of the micro mirror having a reflectivity higher than the central area 100. Therefore, when a bottom of the beam spot reaches to a position falling outside of the reflecting surface of the micro mirror, at least a part of the beam spot is reflected at the area 102. Therefore, intensity of light reflected of the beam spot incident on the end portion of the reflecting surface of the micro mirror is counterbalanced by reduction of intensity of light due to falling outside of the micro mirror and increase of intensity of light due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

In the second modified embodiment of the third embodiment, the arrangement is such that by having the in-area reflectivity distribution inside the area 102, the reflectivity goes on increasing continuously toward an outer side of the micro mirror. Therefore, it is possible to control a local reflectivity such that a weighted average reflectivity increases continuously up to the end portion of the micro mirror, as compared to the third embodiment. Moreover, it is possible to set a structure in which, the contribution of a portion having a high reflectivity to the beam spot with no sticking out is small, and the contribution of a portion having a high reflectivity to the beam spot with sticking out is large, with a higher design flexibility than for the structure in the third embodiment.

Figure 16G:
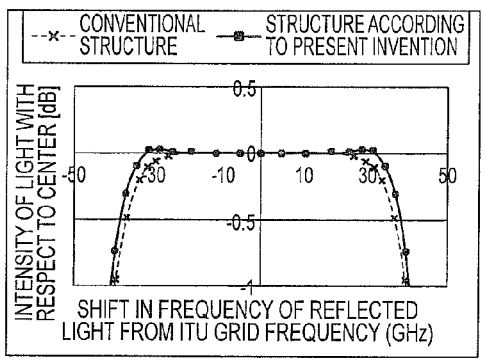
Figure 16D:
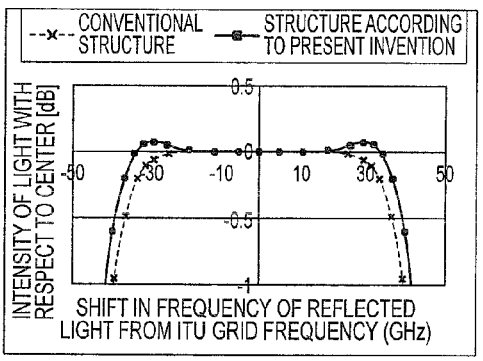

In FIG. 16D, a simulation result of frequency (wavelength) dependence of intensity of light reflected at the reflecting surface of the micro mirror when the structure of the second modified embodiment is used, is shown.

It is revealed that, it is revealed that, by decreasing the intensity loss of light reflected around the reflecting surface of the micro mirror, the passband is wider than conventional wavelength selective switch. Moreover, it is revealed that the ripple is small.

Moreover, the second modified embodiment of the third embodiment can be let to have the following arrangement.

Figure 14B:
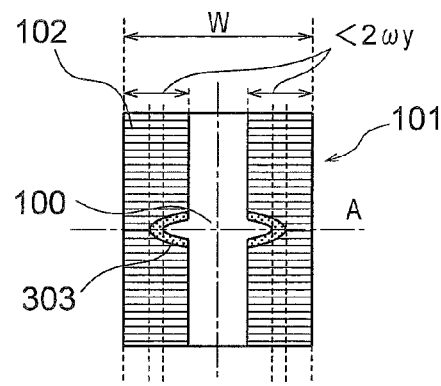
Figure 14C:
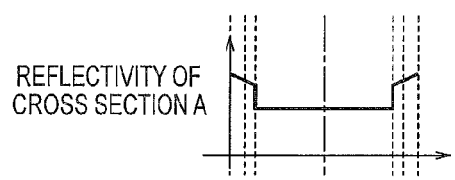
Figure 14D:
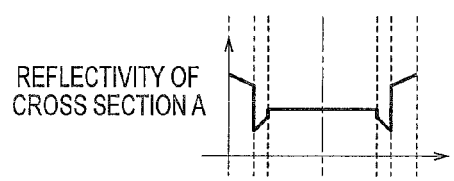
Figure 14E:
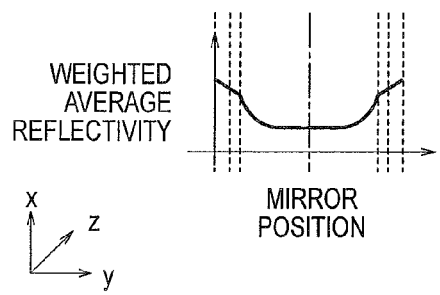
Figure 14F:
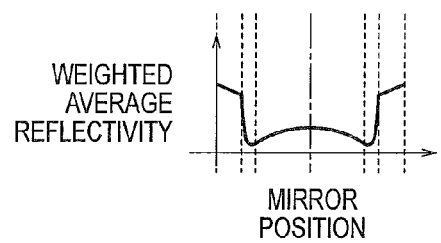

As shown in FIG. 14B, an arrangement is made to be such that, each micro mirror is formed to have an area 303 having a reflectivity lower than a central area 100, and the area 303 is formed between the central area 100 and the area 102 of an end portion of the reflecting surface of the micro mirror having a reflectivity higher than the central area 100. At a boundary of the central area 100, the area 303, and the area 102, the reflectivity distribution is discontinuous, and inside the central area, the reflectivity is uniform. However, inside the area 303, an in-area reflectivity distribution is such that it decreases monotonically toward the end of the micro mirror, and inside the area 102, an in-area reflectivity distribution is such that it increases monotonically toward the end of the reflecting surface of the micro mirror (refer to FIG. 14D). Moreover, a difference in reflectivity of areas is formed by controlling a film thickness of a metallic reflective film which has been formed on the reflecting surface of the micro mirror.

In the second modified embodiment of the third embodiment, an arrangement is made such that the reflectivity distribution satisfies expression (2), expression (6), and expression (7).

The second modified embodiment of the third embodiment has the area 102 of the end portion of the reflecting surface of the micro mirror having a reflectivity higher than the central area 100, and the area 303 having a reflectivity lower than the central area 100. However, with the beam spot falling outside the micro mirror, the contribution of high reflection at the area 102 become large. Therefore, intensity of reflected light of the beam spot which is incident on the end portion of the reflecting surface of the micro mirror is counterbalanced by reduction of the intensity of light due to falling outside of the micro mirror, and increase of intensity of light due to reflection at the area 102, and as a result, difference between intensity of light reflected at an end portion of the reflecting surface of the micro mirror and intensity of light reflected at the central area 100 could be less than the conventional wavelength selective switch, and it is possible to widen the width of the passband.

In the second modified embodiment of the third embodiment, by providing the area 303 having the reflectivity lower than the reflectivity of the central area 100, at an inner side of the end area of the reflecting surface of the micro mirror having the reflectivity higher than the central area 100, it is possible to divide the ripple in a direction in which, intensity of light becomes small, and a direction in which, intensity of light becomes large with respect to intensity of reflected light in a wavelength of the ITU grid. As a result, it is possible to have even more large wide passband effect almost without any ripple. Moreover, by imparting in-area reflectivity distribution even inside the area 303, it is possible to carry out division of the ripple, with a higher design flexibility than in the first modified embodiment of the third embodiment.

In FIG. 16E, a simulation result of frequency (wavelength) dependence of the intensity of light reflected at the micro mirror when the structure of this type of the second modified embodiment of the third embodiment is used, is shown.

It is revealed that, it is revealed that, by decreasing the intensity loss of light reflected around the reflecting surface of the micro mirror, the passband is wider than conventional wavelength selective switch. Moreover, it is revealed that the ripple is divided in a direction in which, the intensity of light becomes small, and in a direction in which, the intensity of light becomes large, and the ripple is small.

In this type of the second modified embodiment of the third embodiment, the reflectivity distribution inside the reflecting surface of the micro mirror is let to increase monotonically toward the end portion of the reflecting surface of the micro mirror. However, for the area with a small contribution to the reflectivity which is subjected to weighted average, it is desirable to set a reflectivity ratio with the center of the micro mirror to an asymptotic value which is not excessively large.

Third Modified Embodiment of Third Embodiment

A third modified embodiment of the third embodiment will be described below.

An overall structure of a wavelength selective switch according to the third modified embodiment of the third embodiment is similar to the wavelength selective switch according to the first embodiment.

Next, a micro mirror of the third modified embodiment of the third embodiment will be described below.

As shown in FIG. 15, in the third modified embodiment of the third embodiment, each micro mirror 101 does not have a discontinuous point in the reflectivity distribution over the overall surface of the reflecting surface of the micro mirror, and the reflectivity distribution is differentiable at any point. Each micro mirror 101 has a reflectivity distribution such that the reflectivity goes on being higher from a center of the reflecting surface of the micro mirror toward an end portion of the reflecting surface of the micro mirror, on the overall surface of the micro mirror. Moreover, a difference in the reflectivity at the central portion 100 and the end portion 102 is formed by controlling a film thickness of a metallic reflective film which is formed on the reflecting surface of the micro mirror.

Even in the third modified embodiment of the third embodiment, the arrangement is made such that the reflectivity distribution satisfies expression (2) and expression (5).

For the third modified embodiment of the third embodiment to satisfy expression (5), it has a reflectivity distribution which increases monotonically toward the end portion of the micro mirror. Therefore, an (weighted) average reflectivity inside a beam spot which is incident at a position at which, a bottom of the beam spot falls outside of the reflecting surface of the micro mirror becomes higher than an (weighted) average reflectivity inside a beam spot which is incident on the center of the reflecting surface of the micro mirror. Therefore, intensity of light reflected of the beam spot incident on the end portion of the reflecting surface of the micro mirror is counterbalanced by reduction of intensity of light due to falling outside of the reflecting surface of the micro mirror and increase of intensity of light due to reflection with a high (weighted) average reflectivity, and as a result, difference between intensity of light reflected at an end portion of the reflecting surface of the micro mirror and intensity of light reflected at the central portion 100 could be less than the conventional wavelength selective switch, and it is possible to widen the width of the passband.

In the third modified embodiment of the third embodiment, the arrangement is such that the reflectivity increases gradually toward an outer side of the reflecting surface of the micro mirror. Therefore, it is possible to have an arrangement in which, the contribution of a portion having a high reflectivity to the beam spot with no sticking out is small, and the contribution of a portion having a high reflectivity to the beam spot with sticking out is large. Moreover, since the reflectivity distribution is defined by a continuous function which is differentiable, as compared to the first modified embodiment of the third embodiment shown in FIG. 13A, it is possible to design the reflectivity distribution with a higher flexibility, and it is possible to impart a smooth reflectivity distribution for a beam spot which is incident at any position on the micro mirror. So, it is possible to reduce an effect such as diffraction which is not shown in the diagram, even more than in the second modified embodiment of the third embodiment shown in FIG. 13B.

In FIG. 16F, a simulation result of frequency (wavelength) dependence of intensity of light reflected at the micro mirror when the structure of the third modified embodiment of the third embodiment is used, is shown. With the beam spot passing toward the end portion of the reflecting surface of the micro mirror, a local reflectivity of the reflecting surface of the micro mirror becomes higher. Therefore, it can be verified that the intensity of falling of the intensity of light reflected around the micro mirror is reduced to be smaller than in the conventional structure. Moreover, it is revealed that the ripple is small.

Moreover, the third modified embodiment of the third embodiment can be let have the following arrangement.

Figure 15A:
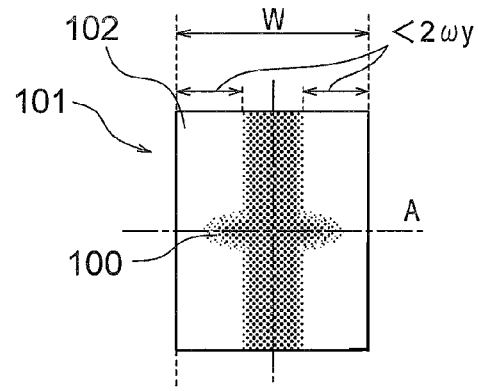
FIG. 15A, FIG. 15B, FIG. 15C, FIG. 15D, FIG. 15E, and FIG. 15F (hereinafter, 'FIG. 15A to FIG. 15F') are diagrams for describing examples of a structure of a micro mirror according to a third group of modified embodiments of the third embodiment.
Figure 15B:
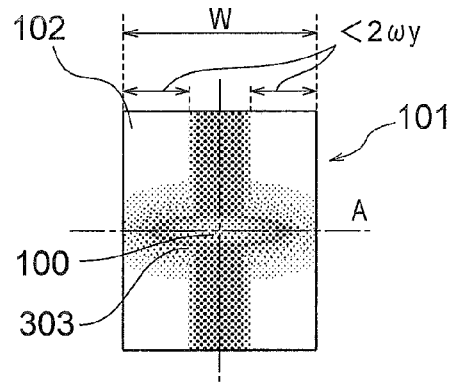
Figure 15C:
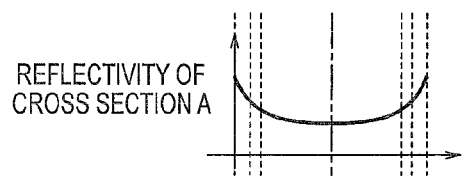
Figure 15D:
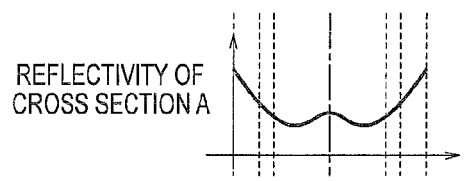
Figure 15E:
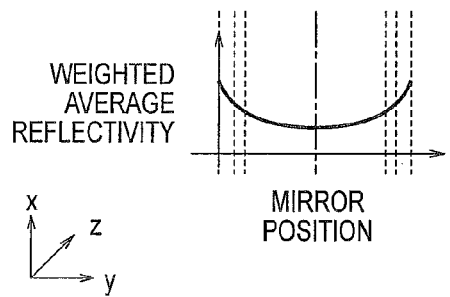
Figure 15F:
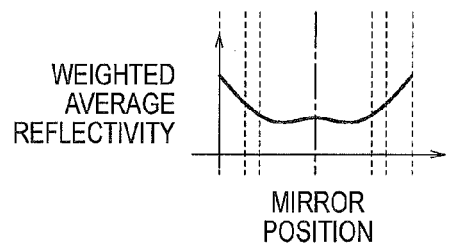

As shown in FIG. 15B, each micro mirror does not have a discontinuous point in the reflectivity distribution over the overall reflecting surface of the micro mirror, and has a local reflectivity distribution in which, the reflectivity distribution is differentiable. Moreover, the local reflectivity distribution is arranged to be such that, the reflectivity is higher at the end portion of the reflecting surface of the micro mirror than at the central portion of the reflecting surface of the micro mirror, and there is a portion having a reflectivity lower than the central portion between the end portion of the reflecting surface of the micro mirror and a central portion of the reflecting surface of the micro mirror. Moreover, a difference in reflectivity of portion is formed by controlling a film thickness of a metallic reflective film which has been formed on the reflecting surface of the micro mirror.

In this type of the third modified embodiment of the third embodiment, an arrangement is made to be such that the reflectivity distribution satisfies expression (2), expression (6), and expression (7).

This type of the third modified embodiment of the third embodiment has the portion having a reflectivity higher than the central portion, and the portion having a reflectivity lower than the central portion. However, with the beam spot falling outside of the reflecting surface of the micro mirror, the contribution of a portion having a high reflectivity of the end portion of the reflecting surface of the micro mirror becomes large. Therefore, intensity of reflected light of the beam spot which is incident on the end portion of the reflecting surface of the micro mirror is counterbalanced by reduction of the intensity of light due to falling outside of the reflecting surface of the micro mirror, and increase of intensity of light due to high reflectivity of the end portion of the reflecting surface of the micro mirror, and as a result, difference between intensity of light reflected at an end portion of the reflecting surface of the micro mirror and intensity of light reflected at the central portion 100 could be less than the conventional wavelength selective switch, and it is possible to widen the width of the passband.

In this type of the third modified embodiment of the third embodiment, by providing the portion having the reflectivity lower than the central portion, at an inner side of the portion of the reflecting surface of the micro mirror having a reflectivity higher than the central portion, it is possible to divide the ripple in a direction in which, intensity of light becomes small, and a direction in which, intensity of light becomes large with respect to the intensity of reflected light in a wavelength of the ITU grid. As a result, it is possible to have even more large wide passband effect almost without any ripple. Moreover, by imparting the continuous reflectivity distribution inside the reflecting surface of the micro mirror, it is possible to carry out division of the ripple, with a higher design flexibility than in the first modified embodiment of the third embodiment. Moreover, it is possible to impart a smooth reflectivity distribution for the beam spot which is incident at any position on the micro mirror, and it is possible to reduce an effect such as diffraction which is not shown in the diagram, even more than in the second modified embodiment of the third embodiment shown in FIG. 13B.

In FIG. 16G, a simulation result of frequency (wavelength) dependence of intensity of light reflected at the micro mirror when the structure of this type of the third modified embodiment of the third embodiment has been used, is shown. It can be verified that the local reflectivity of the end portion of the micro mirror being high, the reduction of the intensity of light reflected around the end portion of the reflecting surface of the micro mirror is smaller than in the conventional structure. Moreover, it can be verified that, the ripple is reduced to be small due to the portion having a reflectivity lower than the reflectivity of the central portion of the reflecting surface of the micro mirror.

In the third modified embodiment of the third embodiment, the reflectivity distribution in the reflecting surface of the micro mirror is let to increase monotonically at the end portion of the reflecting surface of the micro mirror. However, for a portion having a small contribution to the reflectivity which has been subjected to weighted average, it is desirable to set a reflectivity ratio with the central portion of the reflecting surface of the micro mirror to an asymptotic value which is not excessively large.

Here, in each of the embodiments and the modified embodiments described above, imparting of the reflectivity distribution in the reflecting surface of the micro mirror was let to be by a film thickness distribution of the metallic reflective film. However, the reflectivity distribution may be imparted by changing partially a material of the metallic thin film, or by providing an increased-reflection film at a high-reflectivity portion, or by providing a reflection attenuating film at a low-reflectivity portion, or by changing a design of a dielectric multilayer film according to a portion.

Moreover, in each of the embodiments and the modified embodiments described above, the reflectivity distribution inside the micro mirror was symmetric about the center of the reflecting surface of the micro mirror in dispersive direction. However, the reflectivity distribution may be asymmetric, or a high reflectivity distribution portion may be provided only at an end portion on one side in the dispersive direction.

The present invention is not restricted to the embodiments and the modified embodiments described above, and various modifications which fairly fall within the basic teaching herein set forth may be made.

As it has been described above, the wavelength selective switch according to the present invention is capable of realizing widening of the passband without changing a beam diameter, while letting the structure to be simple, low-cost, light-weight, and compact, and is useful in a field of optics According to the present invention, it is possible to provide a wavelength selective switch which is capable of realizing widening of the passband without changing the beam diameter, while maintaining the structure which is simple, low-cost, light-weight, and compact.

What is claimed is:

1. A wavelength selective switch comprising:
   at least one input port, for inputting wavelength-multiplexed light;
   a dispersive element which receives the light from the input port, and disperses the received light;
   a light converging element which converges the dispersed light for each wavelength;
   a micro mirror array having a plurality of micro mirrors which are capable of independently deflecting the dispersed light for each wavelength from the light converging element; and
   at least one output port which receives light which has been deflected by the micro mirror array; wherein
   at least one of the micro mirrors includes a reflecting surface having a reflectivity distribution; wherein
   areas having a reflectivity higher than that of a central area of the reflecting surface are formed in at least a part of each end portion of the reflecting surface in a dispersive direction; and wherein
   each area having a reflectivity higher than that of the central area has a width smaller than a Gaussian beam diameter of a dispersed-light beam incident on the reflecting surface along the dispersive direction and starts from an end of the reflecting surface in the dispersive direction.

2. The wavelength selective switch according to claim 1, wherein the reflectivity distribution is uniform in a direction perpendicular to the dispersive direction.

3. The wavelength selective switch according to claim 2, wherein each area having a reflectivity higher than that of the central area has a reflectivity that gradually increases toward the end of the reflecting surface in the dispersive direction.

4. The wavelength selective switch according to claim 2, wherein areas having a reflectivity lower than that of the central area are formed between the central area and each area having a reflectivity higher than that of the central area.

5. The wavelength selective switch according to claim 1, wherein each area having a reflectivity higher than that of the central area has a reflectivity that gradually increases toward the end of the reflecting surface in the dispersive direction.

6. The wavelength selective switch according to claim 1, wherein areas having a reflectivity lower than that of the central area are formed between the central area and each area having a reflectivity higher than that of the central area.

7. The wavelength selective switch according to claim 1, wherein the central area has a substantially uniform reflectivity.

8. The wavelength selective switch according to claim 7, wherein the reflectivity distribution is uniform in a direction perpendicular to the dispersive direction.

9. The wavelength selective switch according to claim 8, wherein each area having a reflectivity higher than that of the central area has a reflectivity that gradually increases from the central area toward the end of the reflecting surface in the dispersive direction.

10. The wavelength selective switch according to claim 8, wherein areas having a reflectivity lower than that of the central area are formed between the central area and each area having a reflectivity higher than that of the central area.

11. The wavelength selective switch according to claim 7, wherein each area having a reflectivity higher than that of the central area has a reflectivity that gradually increases toward the end of the reflecting surface in the dispersive direction.

12. The wavelength selective switch according to claim 7, wherein areas having a reflectivity lower than that of the central area are formed between the central area and each area having a reflectivity higher than that of the central area.

13. The wavelength selective switch according to claim 7, wherein each area having a reflectivity higher than that of the central area has a substantially uniform reflectivity.

14. The wavelength selective switch according to claim 1, wherein the central area includes an elliptical-shaped area extending along the dispersion direction.

15. The wavelength selective switch according to claim 1, wherein the reflecting surface has a metallic reflective film formed thereon, and wherein the metallic reflective film is thinner at the central area than at the areas having a reflectivity higher than that of the central area.

* * * * *